(12) United States Patent  
Onishi et al.

(10) Patent No.: US 6,996,447 B2
(45) Date of Patent: Feb. 7, 2006

(54) GROUP MANAGEMENT APPARATUS

(75) Inventors: Takaaki Onishi, Ina (JP); Takahiro Komuro, Kamiina-gun (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/798,755

(22) Filed: Mar. 10, 2004

(65) Prior Publication Data

US 2004/0225384 A1 Nov. 11, 2004

Related U.S. Application Data

(63) Continuation of application No. PCT/JP02/09698, filed on Sep. 20, 2002.

(30) Foreign Application Priority Data

Sep. 21, 2001 (JP) .............................. 2001-289964
Sep. 21, 2001 (JP) .............................. 2001-289965

(51) Int. Cl.
*G06F 19/00* (2006.01)
(52) U.S. Cl. ...................... 700/108; 702/182
(58) Field of Classification Search ................ 700/121, 700/117, 108–110, 95–96; 702/182–185
See application file for complete search history.

(56) References Cited

U.S. PATENT DOCUMENTS 6,463,350 B2 * 10/2002 Fukuda et al. ............... 700/121
6,529,792 B1 * 3/2003 Sato et al. ................... 700/121
6,788,990 B1 * 9/2004 Yanaru et al. ............... 700/121

FOREIGN PATENT DOCUMENTS

| JP | 9-50949 A | 2/1997 |
|---|---|---|
| JP | 9-97285 A | 4/1997 |
| JP | 11-338535 A | 12/1999 |
| TW | 451146 | 8/2001 |

* cited by examiner

*Primary Examiner*—Zoila Cabrera
(74) *Attorney, Agent, or Firm*—Frishauf, Holtz, Goodman & Chick, P.C.

(57) ABSTRACT

A lump management apparatus comprising a management computer which is connected with inspection/manufacturing apparatus computers, and includes a transmission/reception function to transmit/receive each information item of the operation conditions set to the respective inspection/manufacturing apparatuses or the maintenance information from each sensor unit to/from the respective apparatus computers, a change function to intensively manage the operation conditions set to the respective apparatus computers in a lump and change the operation conditions in a lump with respect to the computer of the specified each inspection/manufacturing apparatus, a notification function to intensively manage the maintenance information from each sensor unit in a lump, predict an abnormality of the respective inspection/manufacturing apparatuses, and notify a warning at the time of occurrence of the abnormality, and a display function to display each information item of the operation conditions of the respective inspection/manufacturing apparatuses and the like on the same screen of a monitor device.

8 Claims, 11 Drawing Sheets

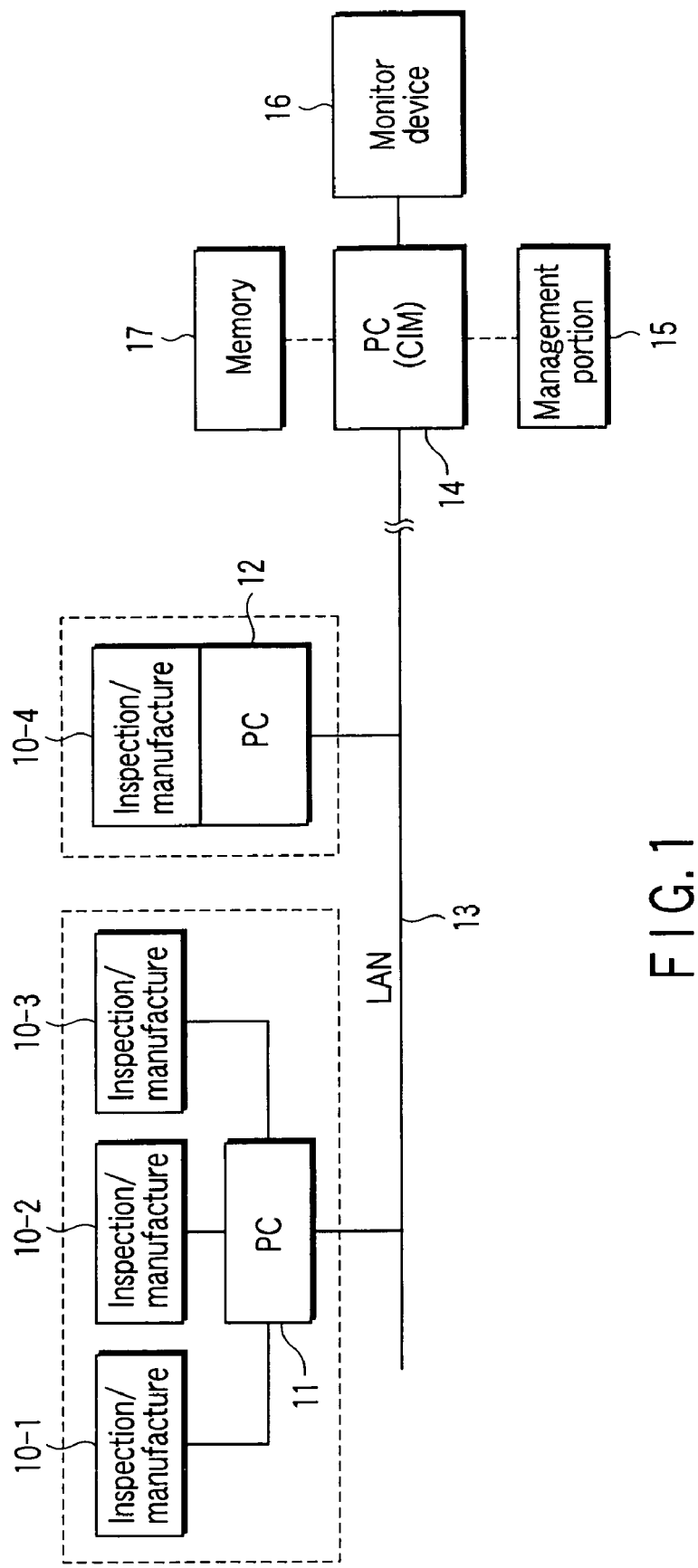
F I G. 1

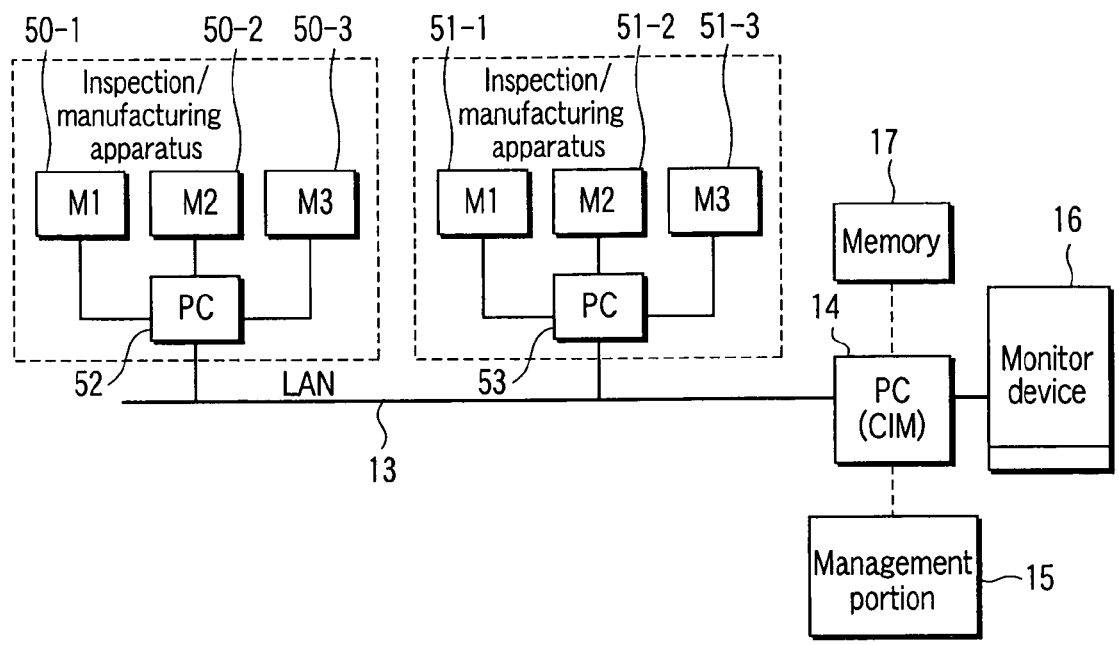
F I G. 10
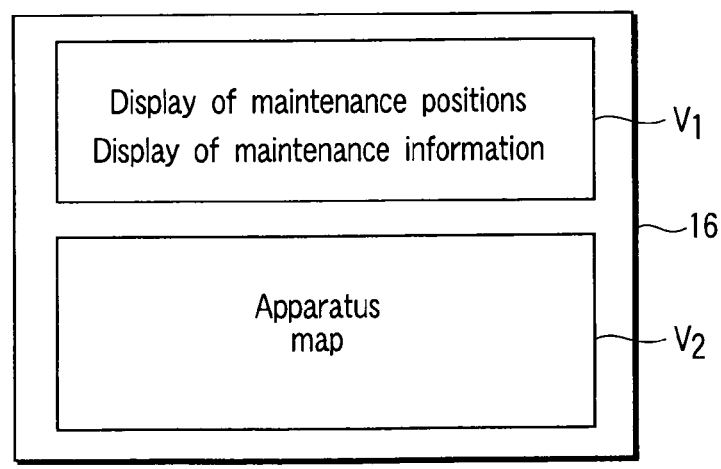
F I G. 11

GROUP MANAGEMENT APPARATUS

CROSS-REFERENCE TO RELATED APPLICATIONS

This is a Continuation Application of PCT Application No. PCT/JP02/09698, filed Sep. 20, 2002, which was not published under PCT Article 21 (2) in English.

This application is based upon and claims the benefit of priority from prior Japanese Patent Applications No. 2001-289964, filed Sep. 21, 2001; and No. 2001-289965, filed Sep. 21, 2001, the entire contents of both of which are incorporated herein by reference.

BACKGROUND OF THE INVENTION

1. Field of the Invention

The present invention relates to a lump (group) management apparatus which manages information of operation conditions or maintenance information of a plurality of inspection/manufacturing apparatuses arranged in an inspection/production line of, e.g., a flat panel display (FPD) such as a liquid crystal display or an organic electroluminescence (EL) display or a semiconductor device such as a semiconductor wafer.

2. Description of the Related Art

For example, various kinds of inspection apparatuses and manufacturing apparatuses are arranged in an inspection/production line of a liquid crystal display. The inspection apparatuses include, e.g., a pattern inspection apparatus, a line width inspection apparatus, a macro inspection apparatus, a micro inspection apparatus, a defect review apparatus, a reflected light visual inspection apparatus, a transmitted light visual inspection apparatus, a micro result review apparatus and others apparatuses.

Further, the manufacturing apparatuses include, e.g., a sputtering apparatus, a chemical vapor deposition (CVD) apparatus, a physical vapor deposition (PVD) apparatus, a pulse laser deposition (PLD) apparatus, a baking apparatus, a resist application apparatus, an aligner apparatus, a chemical etching apparatus, a repair apparatus and others apparatuses. Each information of respective operation conditions (which will be referred to as a recipe hereinafter) is set in these inspection/manufacturing apparatuses.

With respect to each of these inspection/manufacturing apparatuses, there is carried out a maintenance management of operation states of a maintenance target for each apparatus, e.g., a lamp, a motor or a belt.

FIGS. 16 and 17 are views illustrating a method of setting a recipe with respect to each inspection apparatus in the prior art. In FIG. 16, four inspection apparatuses 1-1 to 1-4 which are of the same type are set in a semiconductor device production line. When newly setting or changing a recipe in this line, the same recipe 2 is created with respect to these inspection apparatuses 1-1 to 1-4.

However, when creating the same recipe 2 with respect to each of the inspection apparatuses 1-1 to 1-4, an operator must create the recipe 2 in accordance with each of the inspection apparatuses 1-1 to 1-4, go to the respective inspection apparatuses 1-1 to 1-4 and perform setting there. Therefore, there is required an operation quantity of setting the recipe corresponding to the number of the inspection apparatuses 1-1 to 1-4 arranged in the line.

On the other hand, in FIG. 17, respective computers in the inspection apparatuses 1-1 to 1-4 are connected with each other through a local area network (LAN). If such a structure is adopted, for example, creation of a recipe 2 relative to the inspection apparatus 1-1 is carried out once, and then a file of this recipe 2 can be copied to a folder or the like formed in each computer of the other inspection apparatuses 1-2 to 1-4. As a result, the same recipe can be set in the respective inspection apparatuses 1-1 to 1-4.

However, in setting of the recipe shown in FIG. 16, the number of operations to create the recipe is large for an operator, which is troublesome. Furthermore, since the respective inspection apparatuses 1-1 to 1-4 are set at respective positions on the inspection line, the recipe 2 cannot be created unless an operator moves to installation positions of the inspection apparatuses 1-1 to 1-4. Moreover, even if a difference is produced in a content of the recipe 2 between the respective inspection apparatuses 1-1 to 1-4, an operator is hard to be aware of this fact.

On the other hand, in setting of the recipe shown in FIG. 17, since the file of the recipe 2 is copied to the respective inspection apparatuses 1-2 to 1-4, the operation can be somewhat simplified as compared with setting of the recipe shown in FIG. 17.

However, if a folder to which the file of the recipe 2 is copied is wrong, the recipe 2 cannot be validated in the inspection apparatuses 1-2 to 1-4. Additionally, if the recipe 2 of a given inspection apparatus 1-1 is rewritten and the rewritten content is forgotten to be reflected to the recipes 2 in the other inspection apparatuses 1-2 to 1-4, a difference is generated in operations between the respective inspection apparatuses 1-1 to 1-4.

FIG. 18 is a view illustrating a method of acquiring maintenance information with respect to each inspection/manufacturing apparatus in the prior art. As shown in FIG. 18, when four inspection/manufacturing apparatuses 3-1 to 3-4 are provided, respective inspection items 1$a$ to 1$d$, 2$a$ to 2$d$, 3$a$ to 3$d$ and 4$a$ to 4$d$ as maintenance targets are managed in accordance with these inspection/manufacturing apparatuses 3-1 to 3-4.

In the respective inspection/manufacturing apparatuses 3-1 to 3-4, four lamps are used, and life durations of the respective lamps are managed as the inspection items 1$a$ to 1$d$, 2$a$ to 2$d$, 3$a$ to 3$d$ and 4$a$ to 4$d$.

In the inspection apparatuses used in the production line, an operator Q periodically confirms an hour meter provided in accordance with each of the inspection/manufacturing apparatuses 3-1 to 3-4, and manages life durations of the lamps. It is to be noted that the hour meter measures a life duration of each lamp by using lighting time of the lamp for counting.

However, in the above-described maintenance management, the operator Q must occasionally go to installation positions of the respective inspection/manufacturing apparatuses 3-1 to 3-4 in order to confirm the hour meter of each of the inspection/manufacturing apparatuses 3-1 to 3-4. Further, the hour meters for the 16 lamps must be checked only for confirmation of the lamps in order to manage life durations, which is troublesome.

BRIEF SUMMARY OF THE INVENTION

It is an object of the present invention to provide a lump management apparatus which can intensively manage information of operation conditions or maintenance of various kinds of inspection/manufacturing apparatuses in a lump.

According to the present invention, there is provided a lump management apparatus comprising: a plurality of inspection/manufacturing apparatuses arranged in a semiconductor production line; sensor units for acquiring maintenance information concerning maintenance target items of the respective inspection/manufacturing apparatuses; inspection/manufacturing apparatus computers each of which is connected with each of or a groups of the inspection/manufacturing apparatuses and includes a function to control operations of the respective inspection/manufacturing apparatuses in accordance with operation conditions corresponding to the respective inspection/manufacturing apparatuses; and a management computer which is connected with the respective inspection/manufacturing apparatus computers through a communication line, and includes: a transmission/reception function to transmit/receive each information item of the operation conditions set to the respective inspection/manufacturing apparatuses or the maintenance information from each sensor unit of the inspection/manufacturing apparatuses to/from the respective inspection/manufacturing apparatus computers; a change function to intensively manage the operation conditions set to the respective inspection/manufacturing apparatus computers in a lump and change the operation conditions in a lump with respect to the inspection/manufacturing computer of the specified each inspection/manufacturing apparatus; a notification function to intensively manage the maintenance information from each sensor unit of each inspection/manufacturing apparatus in a lump, monitor an abnormality of the respective inspection/manufacturing apparatuses based on the maintenance information in order to predict the abnormality, and notify a warning at the time of occurrence of the abnormality; and a display function to display each information item of the operation conditions of the respective inspection/manufacturing apparatuses or each maintenance information item and an arrangement layout drawing of the respective inspection/manufacturing apparatuses on the same screen of a monitor device.

BRIEF DESCRIPTION OF THE SEVERAL VIEWS OF THE DRAWING

FIG. 1 is a view showing an entire structure of an inspection/manufacturing system to which a lump management apparatus according to an embodiment of the present invention is applied;

FIG. 10 is a view showing an entire structure of an inspection/manufacturing system to which a maintenance lump management apparatus according to the embodiment of the present invention is applied;

FIG. 11 is a schematic view showing display outputs of maintenance information and a apparatus map according to the embodiment of the present invention;

DETAILED DESCRIPTION OF THE INVENTION

Figure 2:
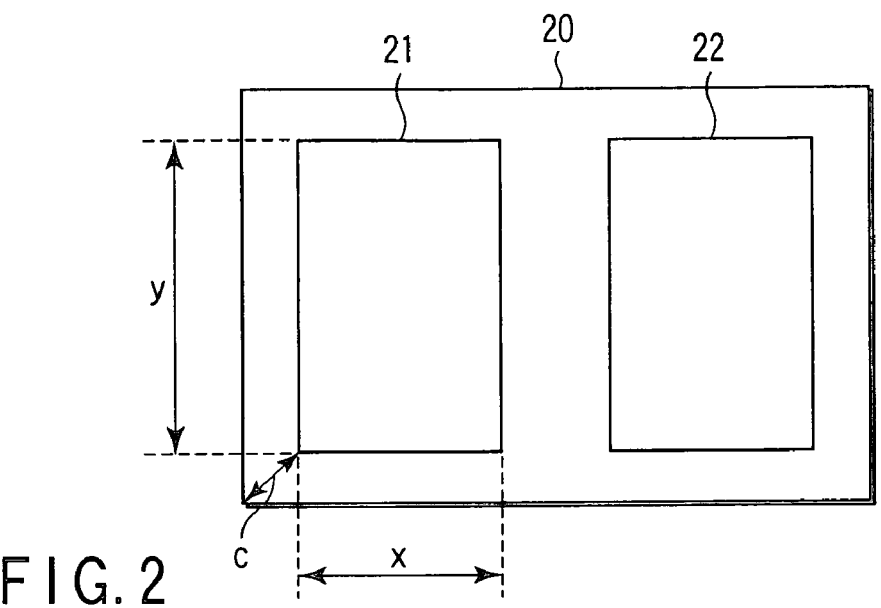
FIG. 2 is a type drawing showing a recipe of a glass substrate used in a liquid crystal display according to the embodiment of the present invention.

The following will describe the first embodiment of the present invention with reference to drawings.

FIG. 1 is a view showing an entire structure of an inspection/manufacturing system to which a lump management apparatus according to the present invention is applied. This inspection/manufacturing system is set in an inspection/production line of an FPD substrate such as a liquid crystal display or an organic ED display or a semiconductor device such as a semiconductor wafer. A plurality of inspection apparatuses or manufacturing apparatuses (which will be referred to as inspection/manufacturing apparatuses hereinafter) 10-1 to 10-4 are provided to the inspection/manufacturing line.

Three inspection/manufacturing apparatuses 10-1 to 10-3 are connected with one personal computer for inspection/manufacturing apparatus (which will be referred to as a PC hereinafter) 11. This PC 11 has a function to control operations of the three inspection/manufacturing apparatuses 10-1 to 10-3 in accordance with their recipes (operation conditions). Further, one inspection/manufacturing apparatus 10-4 is connected with another inspection/manufacturing apparatus personal computer (which will be referred to as a PC hereinafter) 12. This PC 12 has a function to control operations of the inspection/manufacturing apparatus 10-4 in accordance with its recipe.

Each of the inspection/manufacturing apparatuses 10-1 to 10-4 is an inspection apparatus such as a pattern inspection apparatus, a line width inspection apparatus, an auto macro inspection apparatus, a manual macro inspection apparatus, a micro inspection apparatus, a defect review apparatus, a reflected light visual inspection apparatus, a transmitted light visual inspection apparatus or a micro result review apparatus, or a manufacturing apparatus such as a sputtering apparatus, a chemical vapor deposition (CVD) apparatus, a physical vapor deposition (PVD) apparatus, a pulse laser deposition (PLD) apparatus, a baking apparatus, a resist application apparatus, an aligner apparatus, a chemical etching apparatus or a repair apparatus.

It is to be noted that a macro inspection performs an inspection by irradiating a glass substrate used in, e.g., a liquid crystal display with illumination light beams and visually confirming an defective part such as adherence or contaminations of dusts/particles, scratches or fractures on the glass substrate by an examiner, or imaging and displaying it as a monitor image. A micro inspection performs inspection by magnifying a defective part detected by the macro inspection apparatus by using a microscope and observing it by utilizing an eyepiece, or displaying an enlarged image of the microscope in a monitor.

The respective PCs 11 and 12 are connected to a management PC (CIM: Computer Integrated Manufacturing) 14 through a local area network (LAN) 13. This PC 14 transmits/receives information to/from the respective PCs 11 and 12 through the LAN 13. To the PC 14 is connected a monitor device 16 such as a color liquid crystal display or a CRT display.

A description will now be given as to an example of a content of a recipe set to each of the inspection/manufacturing apparatuses 10-1 to 10-4. As one of recipes, there is a recipe of a glass substrate used in a liquid crystal display.

FIG. 2 is a type drawing showing a recipe of a glass substrate used in a liquid crystal display. If, e.g., two surfaces are acquired, the recipe of the glass substrate is sizes x and y of each of cells 21 and 22 in the glass substrate 20 or a distance c from a corner of the glass substrate 20 to the cell 21 as shown in FIG. 2. Furthermore, as the recipe of the glass substrate 2, there are cell arrangement information of two-surface acquisition, four-surface acquisition, six-surface acquisition and others. The recipe of this glass substrate indicates a value which differs depending on sizes of the glass substrate 20 or surface acquisition conditions. This cell arrangement information is also the recipe which determines an inspection area of each inspection. For example, all cells can be set as inspection areas in the macro inspection, and one arbitrary cell can be set as an inspection area in the line width inspection.

Figure 3:
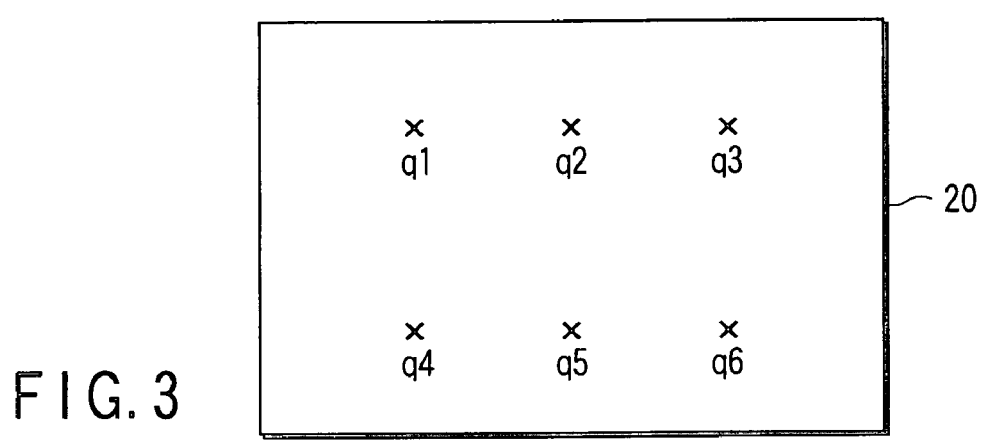
FIG. 3 is a type drawing showing a recipe of a line width inspection according to the embodiment of the present invention.

FIG. 3 is a type drawing showing a recipe of the line width inspection. A recipe of the line width inspection is, e.g., inspection positions q1 to q6 when inspecting a line width of a pattern formed on the glass substrate 20 in a liquid crystal display as shown in FIG. 3. Moreover, as the recipe of the line width inspection, there are alignment information of, e.g., a center of a pattern, magnification of an object lens in a microscope device which inspect a line width, brightness when illuminating the glass substrate 20, a standard value of line width and others.

Figure 4:
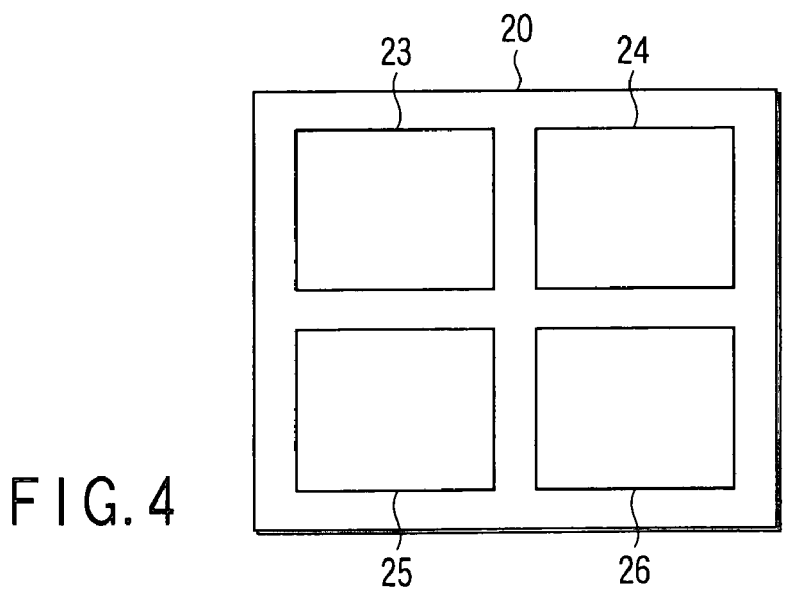
FIG. 4 is a type drawing showing a recipe of a pattern inspection according to the embodiment of the present invention.

FIG. 4 is a type drawing showing a recipe of a pattern inspection. As the recipe of the pattern inspection, there is, e.g., cell arrangement information of two-surface acquisition, four-surface acquisition, six-surface acquisition or the like on the glass substrate used in a liquid crystal display, and it is pattern inspection areas 23 to 26 (corresponding to each cell) in the glass substrate 20 as shown in FIG. 4. Additionally, the recipe has a brightness when illuminating the glass substrate 20, a magnitude of a defect as a defect judgment level on the glass substrate 20, the number of defects, a threshold value used to judge a defective unit (defect judgment reference) and others.

Further, the recipe includes operation conditions required to perform various kinds of inspections as well as cell arrangement information as inspection areas in case of an inspection apparatus for, e.g., a macro inspection, a micro inspection, a defect review, a reflected light visual inspection, a transmitted light visual inspection or a micro result review.

Furthermore, in case of a manufacturing apparatus for, e.g., sputtering, chemical vapor deposition (CVD), physical vapor deposition (PVD), pulse laser deposition (PLD), baking, resist application, an aligner, chemical etching or repair, operation conditions required to perform these manufacturing operations are included.

A management portion 15 of the PC 14 has a function to communicate with each of the PCs 11 and 12 of the inspection/manufacturing apparatuses 10-1 to 10-4 through the LAN 13, read all recipes set to these inspection/manufacturing apparatuses 10-1 to 10-4 and intensively manage them in a lump. In this case, the management portion 15 develops the recipes read from the respective inspection/manufacturing apparatuses 10-1 to 10-4 into a memory 17 in the PC 14. The recipes can be stored in the memory 17 in the PC 14 in advance, and transmitted to the inspection/manufacturing apparatus PCs 11 and 12 connected to the respective inspection/manufacturing apparatuses 10-1 to 10-4 through the LAN 13.

Software (lump intensive management program) used to intensively manage all the recipes set in the inspection/manufacturing apparatuses 10-1 to 10-4 in a lump as described above is installed in the management portion 15. The management portion 15 executes the following respective functions by activating this lump intensive management program.

The management portion 15 has a function to display and output all the recipes set to the respective inspection/manufacturing apparatuses 10-1 to 10-4 to a monitor apparatus 16, or display and output only the recipes of specified desired inspection/manufacturing apparatuses 10-1 to 10-4.

The management portion 15 has a function to change all the recipes set to the respective inspection/manufacturing apparatuses 10-1 to 10-4 in a lump, or change only the recipes of specified desired inspection/manufacturing apparatuses 10-1 to 10-4 in a lump.

The management portion 15 has a function to enable a timing that the changed recipes of the respective inspection/manufacturing apparatuses 10-1 to 10-4 become valid to be set. An operator can arbitrarily set the timing that the recipes become valid. For example, it is possible to set in such a manner that the changed recipes become valid when year/month/day is changed, that they become valid from a next lot, or that they immediately become valid.

The management portion 15 has a function to record the changed recipes and histories of the respective inspection/manufacturing apparatuses 10-1 to 10-4, and a history of an operator who has performed that operation. This history of each recipe is recorded in the memory 17 in the PC 14.

Figure 5:
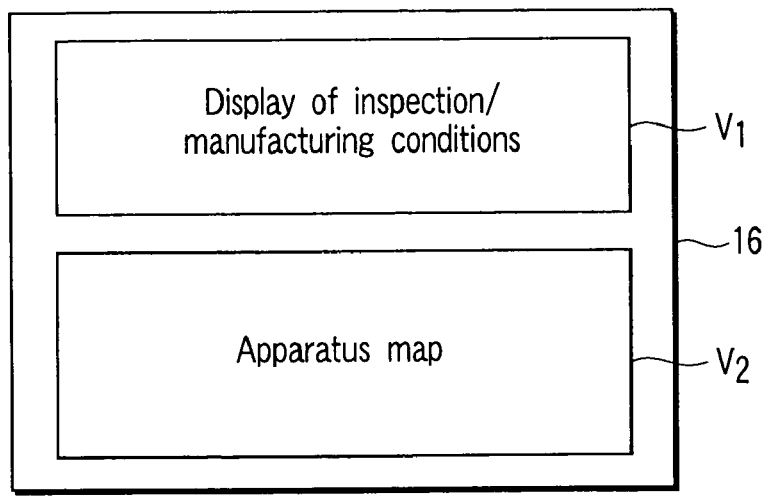
FIG. 5 is a schematic view showing display outputs of the recipe and a apparatus map according to the embodiment of the present invention.

FIG. 5 is a schematic view showing display outputs of a recipe and a apparatus map. The management portion 15 has a function to display and output the recipes of the respective inspection/manufacturing apparatuses 10-1 to 10-4 or only the recipes of specified desired inspection/manufacturing apparatuses 10-1 to 10-4 as a display column $V_1$ for inspection/manufacturing conditions to the monitor device 16, and display and output a apparatus map $V_2$ as shown in FIG. 5.

Figure 6:
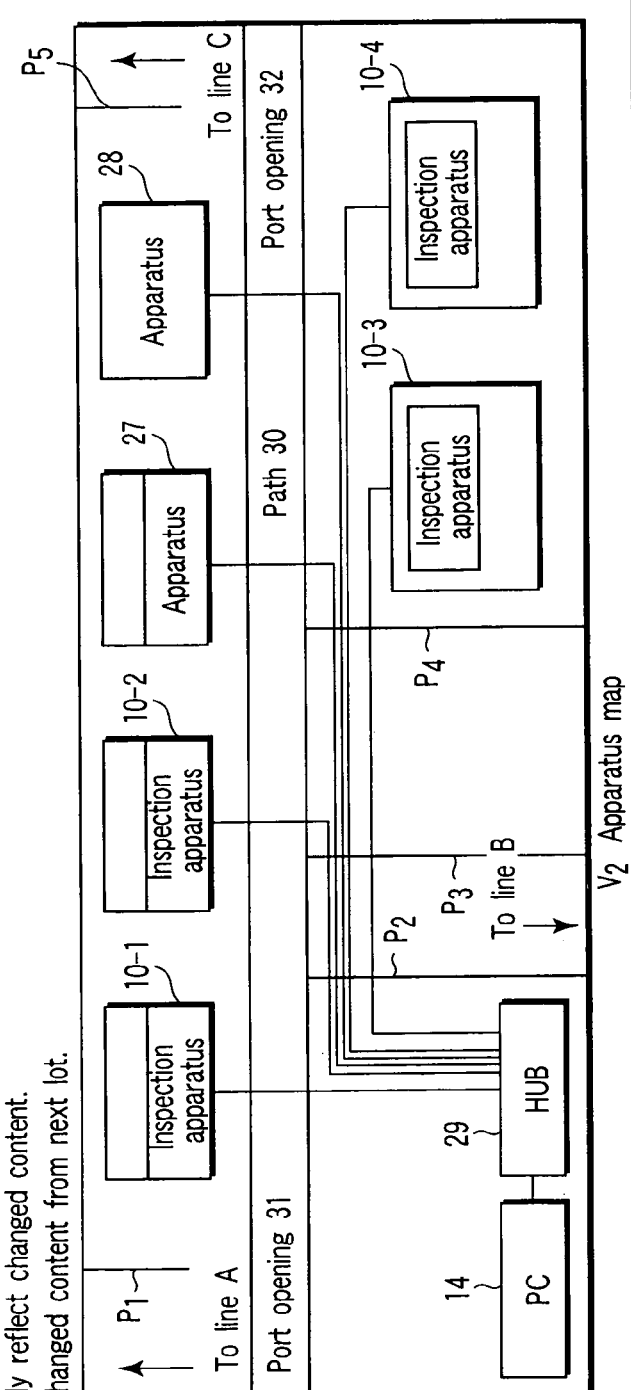
FIG. 6 is a view showing a display example of a display column of inspection/manufacturing conditions and a apparatus map according to the embodiment of the present invention.

FIG. 6 is a view showing a display example of a display column for the inspection/manufacturing conditions and a apparatus map. A concrete display example will now be described with reference to FIG. 6. In a display screen W of the monitor device 16, a display column $V_1$ for the inspection/manufacturing conditions is displayed on the upper side, and a apparatus map $V_2$ is displayed on the lower side.

The recipes of the respective inspection/manufacturing apparatuses 10-1 to 10-4 are displayed in the display column $V_1$ of the inspection/manufacturing conditions. Here, the inspection apparatuses of the respective inspection/manufacturing apparatuses 10-1 to 10-4 are displayed. In these recipes, there is displayed each information such as "brightness of illumination", "presence/absence of inspection function", "proprieties of inspection types", "power supply of illumination" or the like with respect to each of the inspection apparatuses 10-1 to 10-4.

The "brightness of illumination" is indicated by a voltage value [V] applied to a lamp. The "presence/absence of inspection function" indicates whether there is a function of, e.g., a pattern inspection "1", a line width inspection "2", a macro inspection "3" and a micro inspection "4" with respect to the respective inspection apparatuses 10-1 to 10-4. In the "presence/absence of inspection function", "○" indicates that the inspection function is included, and "x" indicates that the inspection function is not included. The "proprieties of inspection types" indicate whether the inspection functions (corresponding to inspection types) "1" to "4" are carried out with respect to the respective inspection apparatuses 10-1 to 10-4. In the proprieties of inspection types, "○" indicates that the inspection functions are carried out, and "x" indicates that they are not carried out.

The "power supply of illumination" indicates ON and OFF of a power supply relative to each of the inspection apparatuses 10-1 to 10-4 when performing the inspection. It is to be noted that the power supplies of the illuminations of all the inspection apparatuses 10-1 to 10-4 are ON in this display example.

There are displays used to select a timing that the recipes become valid, i.e., "immediately reflect changed content" or "validate changed content from next lot" under such a display column $V_1$ of the inspection/manufacturing conditions.

The apparatus map $V_2$ is a visual display output obtained by drawing an arrangement of the respective inspection apparatuses 10-1 to 10-4 set in an actual manufacturing plant, other apparatuses 27 and 28, a PC 14, and a HUB 29 used to connect this PC 14, the respective inspection apparatuses 10-1 to 10-4 and the other apparatuses 27 and 28 with each other.

Furthermore, in this apparatus map $V_2$, objects such as a path 30 or port openings 31 and 32 are also displayed as layouts, and arrangement directions of respective lines in an inspection/production line, e.g., arrangement directions of a line A, a line B and a line C are displayed by using arrows "→" in order to recognize positions of the respective inspection apparatuses 10-1 to 10-4 arranged in the factory at a glance.

Specifically, the path 30 is displayed in the right-and-left direction in the monitor screen, and the inspection apparatuses 10-1 and 10-2 and the other apparatuses 27 and 28 are arranged and displayed on one side while the inspection apparatuses 10-3 and 10-4, the PC 14 and the HUB 29 are arranged and displayed on the other side with the path 30 at the center. It is to be noted that $P_1$ to $P_5$ denote partitions used to partition respective sections. Moreover, in this visual display, the respective inspection apparatuses 10-1 to 10-4 (management targets) displayed in the display column $V_1$ and the other apparatuses 27 and 28 (non-targets of management) are displayed in different colors, or different colors are used to display each inspection/production line (apparatus group).

The management portion 15 has a function to sort/select (classify/select) the recorded recipes of the inspection/manufacturing apparatuses 10-1 to 10-4. This sort/select function is a function to display contents in the order of apparatuses names (sorting based on apparatus names) or enable/disable display in accordance with types of apparatuses (selection based on apparatus types).

Additionally, the management portion 15 has a function to enable rewriting of the recipes in a lump in accordance with each apparatus, each apparatus category, each inspection/production line (apparatus groups) which the apparatus belongs to by utilizing the sort/select function.

A description will now be given as to an operation of the inspection/manufacturing system having the above-described structure. The setting or change of each recipe of each of the inspection/manufacturing apparatuses 10-1 to 10-4 are performed as follows.

The management portion 15 of the PC 14 performs communication with the respective PCs 11 and 12 of the respective inspection/manufacturing apparatuses 10-1 to 10-4 through the LAN 13 by activating the lump intensive management program, reads all recipes set in these inspection/manufacturing apparatuses 10-1 to 10-4, develops them into the inner memory 17, and carries out the lump intensive management.

The management portion 15 displays and outputs the recipes of all the inspection/manufacturing apparatuses 10-1 to 10-4 to the monitor device 16 in accordance with operations of an operator. Alternatively, the management portion 15 displays and outputs only the recipes of the respective inspection/manufacturing apparatuses 10-1 to 10-4 classified by using the sort/select function to the monitor device 16 in accordance with operations of the operator.

When the recipes of the respective inspection/manufacturing apparatuses 10-1 to 10-4 are displayed and output to the monitor device 16 in this manner, the management portion 15 changes the recipes set to the respective inspection/manufacturing apparatuses 10-1 to 10-4 in a lump or changes only the recipes of the desired inspection/manufacturing apparatuses 10-1 to 10-4 classified by using the sort/select function in accordance with operations of the operator.

Further, the management portion 15 displays and outputs the recipes of the respective inspection/manufacturing apparatuses 10-1 to 10-4 to the monitor devices 16 as the display column $V_1$ of the inspection/manufacture conditions as shown in FIG. 6, and visually displays and outputs the apparatus map $V_2$ of, e.g., the respective inspection apparatuses 10-1 to 10-4 set in a manufacturing plant.

The setting/change of the recipes of the respective inspection/manufacturing apparatuses 10-1 to 10-4 is performed by manipulating the display column $V_1$ of the inspection/manufacture conditions by the operator while watching the visually displayed apparatus map $V_2$. For example, the "proprieties of inspection types" of the respective inspection apparatuses 10-1 to 10-4 in the display column $V_1$ of the inspection/manufacture conditions, i.e., whether the pattern inspection "1", the line width inspection "2", the macro inspection "3" and the micro inspection "4" are carried out is set by operating the symbols "○" and "x". As a result, the recipes can be set/changed.

As another setting/change of the recipes, the sizes x and y of the respective cells 21 and 22 in the glass substrate 20, the distance c from the corner of the glass substrate 20 to the cell 21, a glass substrate size, cell arrangement information and others are set/changed.

In case of the recipes for the line width inspection, the inspection positions q1 to q6 when inspecting the line width of a pattern, alignment information of the pattern, a magnification of an objective lens in a microscope apparatus, a brightness when illuminating the glass substrate 20, a standard value of the line width and others are set/changed.

In case of the recipes for the pattern inspection, the areas 23 to 26 of the pattern inspection, cell arrangement information, a brightness when illuminating the glass substrate 20, a size of a defect as a defect judgment level on a surface of the glass substrate 20, the number of defects, a threshold value used to judge as a defective unit and others are set/changed.

In this setting/change of the recipes, using the sort/select function can set/change only the recipes for a desired inspection type, e.g., the pattern inspection "1" in the desired inspection/manufacturing apparatuses 10-1 to 10-4. Moreover, changing (rewriting) of the recipes can be performed as described above in accordance with each apparatus, each apparatus category, a line (apparatus group) to which the apparatus belongs or the like in a lump by using the sort/select function.

Additionally, upon receiving operations by an operator, the management portion 15 can set a timing with which the changed recipes of the respective inspection/manufacturing apparatuses 10-1 to 10-4 become valid. For example, in the monitor display screen shown in FIG. 6, when an operator checks "immediately validate changed content" or "validate changed content from next lot" below the display column V1 of the inspection/manufacture conditions, a timing with which the recipes become valid can be selected.

When the recipes of the respective inspection/manufacturing apparatuses 10-1 to 10-4 are set/changed in this manner, the management portion 15 records a history of the collectively set/changed recipes of the respective inspection/manufacturing apparatuses 10-1 to 10-4 in the memory 17 in the PC 14. At this time, a history of the operator who performed the operation is also recorded.

As described above, in the first embodiment, the PC 14 is connected to the respective PCs 11 and 12 of the respective inspection/manufacturing apparatuses 10-1 to 10-4 through the LAN 13, and all the recipes set to the inspection/manufacturing apparatuses 10-1 to 10-4 are read and intensively managed in a lump by using the management portion 15 of this PC 14. As a result, the recipes of the respective inspection/manufacturing apparatuses 10-1 to 10-4 and the other apparatuses 27 and 28 can be collectively intensively managed in one PC 14.

In this lump intensive management, the recipes of all the inspection/manufacturing apparatuses 10-1 to 10-4 can be read and then displayed and output to the monitor device 16, or only the recipes of the specified/classified desired inspection/manufacturing apparatuses 10-1 to 10-4 can be displayed and output to the monitor device 16.

Further, all the recipes set to the respective inspection/manufacturing apparatuses 10-1 to 10-4 can be changed in a lump, or only the recipes of the desired inspection/manufacturing apparatuses 10-1 to 10-4 can be changed. In this setting/change of the recipes, using the sort/select function can set/change the recipes for only a desired inspection type, e.g., the pattern inspection "1" in the desired inspection/manufacturing apparatuses 10-1 to 10-4. Furthermore, the recipes can be changed in a lump in accordance with each apparatus, each apparatus category, each inspection/production line (apparatus group) to which the apparatus belongs or the like.

Such a setting/change of the recipes is performed by an operator while watching the display column $V_1$ of the inspection/manufacture conditions displayed and output to the monitor device 16 and the visually displayed apparatus map $V_2$. Therefore, a difference in recipes between the respective inspection/manufacturing apparatuses 10-1 to 10-4 and the other apparatuses 27 and 28 can be visually definitely determined, a wrong apparatus is not taken for a apparatus whose recipe is to be set/changed, and an input error of the recipes can be avoided. In particular, since the respective inspection/manufacturing apparatuses 10-1 to 10-4 and the other apparatuses 27 and 28 are displayed in different colors, an operation error or a judgment error relative to a apparatus whose recipe is to be set/changed can be avoided.

Therefore, since the apparatus map $V_2$ is visually displayed, an operator can efficiently set/change the recipes of the respective inspection/manufacturing apparatuses 10-1 to 10-4 and the other apparatuses 27 and 28. Moreover, it is possible to set a timing with which all the collectively changed recipes of the respective inspection/manufacturing apparatuses 10-1 to 10-4 or only the changed recipes of the desired inspection/manufacturing apparatuses 10-1 to 10-4 become valid.

Additionally, a history of the collectively set/changed recipes of the respective inspection/manufacturing apparatuses 10-1 to 10-4 and a history of an operator who performed that operation are recorded. Therefore, when a difference is produced in operation between the respective inspection/manufacturing apparatuses 10-1 to 10-4, a factor of occurrence of the difference can be inquired by viewing the history of the recipes.

It is to be noted that set contents of the recipes of the respective inspection/manufacturing apparatuses 10-1 to 10-4 can be protected by giving a password to an operator who sets/changes the recipes when operating the PC 14.

A description will now be given as to a modification of the first embodiment when applying the lump management apparatus according to the present invention.

Figure 7:
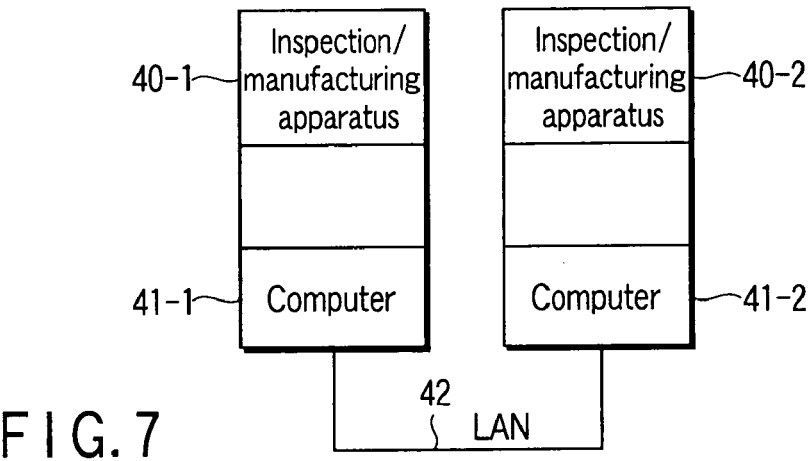
FIG. 7 is a view showing a structure when a plurality of inspection/manufacturing apparatuses are set according to the embodiment of the present invention.

FIG. 7 is a view showing a structure when a plurality of inspection/manufacturing apparatuses 40-1 and 40-2 are installed. The inspection/manufacturing apparatuses 40-1 and 40-2 are respectively provided with computers 41-1 and 41-2, and these computers 41-1 and 41-2 are connected with each other through a LAN 42 so as to be capable of communicating with each other.

Software which reads all recipes set in the respective inspection/manufacturing apparatuses 40-1 and 40-2 and intensively manages them in a lump is installed on one of the computers 41-1 and 41-2, i.e., the computer 41-1 or 41-2, and it has the same function as the management portion 15.

With this structure, one computer having the management portion function can read the recipes of the respective inspection/manufacturing apparatuses from the plurality of computers and display them in the monitor, intensively manage all the recipes in a lump, and perform setting/change or the like of these recipes.

Figure 8:
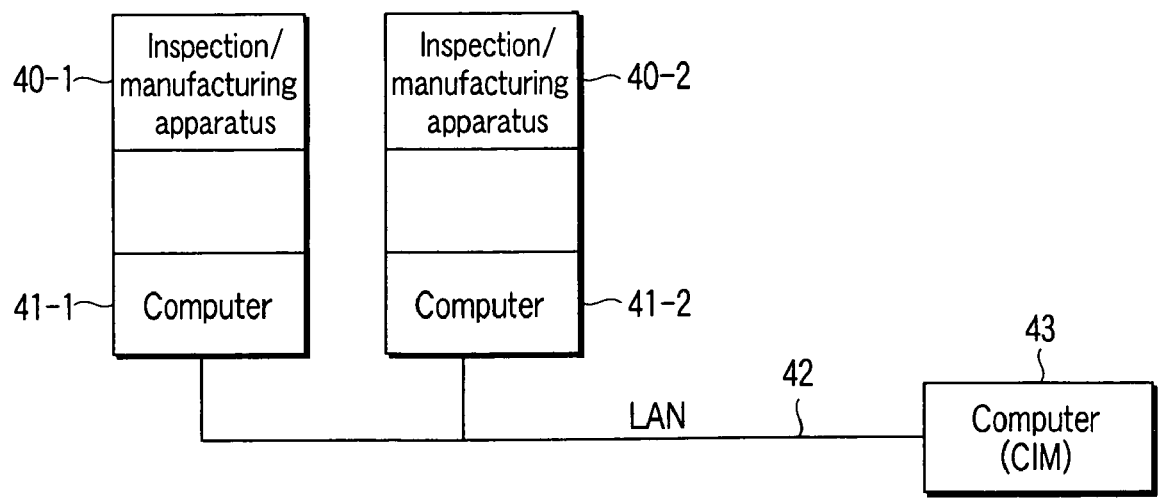
FIG. 8 is a view showing a structure in which a plurality of inspection/manufacturing apparatuses are set and a computer is connected with computers of these inspection/manufacturing apparatuses according to the embodiment of the present invention.

FIG. 8 is a view showing a structure in which a computer (CIM) 43 is connected with the computers 41-1 and 41-2 of the plurality of inspection/manufacturing apparatuses 40-1 and 40-2 through the LAN 42.

Software which reads all the recipes set in the respective inspection/manufacturing apparatuses 40-1 and 40-2 and intensively manages them in a lump is installed in the computer 43, and it has the same function as the management portion 15.

With such a structure, the computer 43 having the integrated management portion function can read the recipes from the computers 41-1 and 41-2 of the respective inspection/manufacturing apparatuses 40-1 and 40-2 and display them in the monitor, intensively manage all the recipes in a lump, and perform setting/change or the like of these recipes.

In case of the mode that the recipes are intensively managed in a lump by using the integrated computer 43 in this manner, the recipe management effect is higher than that of the mode shown in FIG. 7. It is to be noted that this mode forms a basic structure of the apparatus depicted in FIG. 1.

Figure 9:
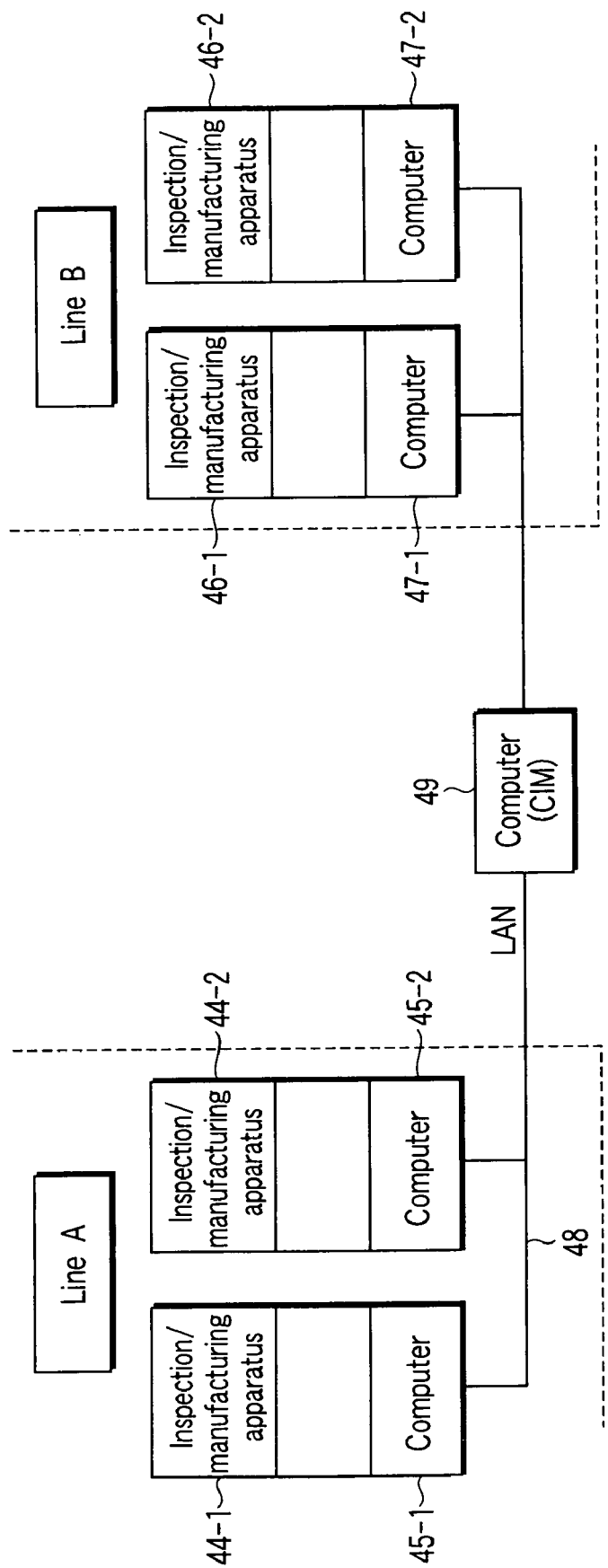
FIG. 9 is a view showing a structure applied to a plurality of inspection/production lines according to the embodiment of the present invention.

FIG. 9 is a view showing a structure applied to a plurality of inspection/production lines. A plurality of inspection/manufacturing apparatuses 44-1 and 44-2 are installed in an inspection/production line A, and these inspection/manufacturing apparatuses 44-1 and 44-2 respectively include computers 45-1 and 45-2. A plurality of inspection/manufacturing apparatuses 46-1 and 46-2 are installed in an inspection/production line B, and these inspection/manufacturing apparatuses 46-1 and 46-2 respectively include computers 47-1 and 47-2.

A computer (CIM) 49 is connected with the respective computers 45-1, 45-2, 47-1 and 47-2 of the respective inspection/manufacturing apparatuses 44-1, 44-2, 46-1 and 46-2 in these inspection/production lines A and B through a LAN 48. Software which reads all recipes set in the respective inspection/manufacturing apparatuses 44-1, 44-2, 46-1 and 46-2 and intensively manages them in a lump is installed on this computer (CIM) 49, and it has the same function as the management portion 15.

With such a structure, the computer 49 having the integrated management portion function can read the recipes from the computers 45-1, 45-2, 47-1 and 47-2 of the respective inspection/manufacturing apparatuses 44-1, 44-2, 46-1 and 46-2 in the plurality of inspection/production lines A and B and display them in the monitor, intensively manage all the recipes in a lump, and perform setting/change or the like of these recipes.

Meanwhile, when the inspection/manufacturing apparatuses 44-1 and 44-2 and the inspection/manufacturing apparatuses 46-1 and 46-2 are similarly arranged like in the inspection/production lines A and B, an operator may possibly take a wrong apparatus for a correct apparatus to which information is input when setting/changing the recipes.

As a countermeasure, in the present invention, a display column $V_1$ of inspection/manufacture conditions and a apparatus map $V_2$ for visual display are displayed and output to a monitor device 16 of the computer 49. As a result, since the operator can set/change the recipes while watching the display column $V_1$ of the inspection/manufacture conditions and the apparatus map $V_2$, the inspection/manufacturing apparatuses 44-1 and 44-2 in the inspection/production line A and the inspection/manufacturing apparatuses 46-1 and 46-2 in the inspection/production line B can be visually definitely determined, a wrong apparatus is not taken for a apparatus whose recipe is to be set/changed, and an input error of the recipes can be avoided. Moreover, using the sort/select function can change the recipes in a lump in accordance with each apparatus, each apparatus category, each inspection/production line or the like. Additionally, in the visual display of the apparatus map $V_2$, by displaying the apparatuses in different colors in accordance with each line or displaying the apparatuses whose recipes are to be set/changed by using the flashing display or different brightnesses in order to provide the visually clear determination, input errors of the recipes can be avoided.

It is to be noted that the present invention is not restricted to the first embodiment, and various modifications can be carried out without departing from the scope on the embodying stage.

For example, although the PC 14 is connected with the PCs 11 and 12 of the inspection/manufacturing apparatuses 10-1 to 10-4 through the LAN 13 in the first embodiment, communicating means between the respective inspection/manufacturing apparatuses 10-1 to 10-4 and the PC 14 is not restricted to the LAN 13, and the Internet may be used. Therefore, the PC 14 does not have to be necessarily provided in a manufacturing plant in which the inspection/manufacturing apparatuses 10-1 to 10-4 are set. For example, the PC 14 may be provided in a lump management center established in another region (e.g., inside or outside Japan) so that the respective recipes of the respective apparatuses in a plurality of manufacturing plants can be intensively managed in a lump.

Further, the monitor device 16 which displays the display column $V_1$ of the inspection/manufacture conditions and the visually displayed apparatus map $V_2$ is not restricted to a color liquid crystal display or a CRT display, and it is possible to use a display which performs display by using a light emitting diode (LED) or using a lamp or the like for an indicator panel having a layout drawing in which the respective inspection/manufacturing apparatuses 10-1 to 10-4 are displayed in the form of symbols.

A second embodiment according to the present invention will now be described hereinafter with reference to the accompanying drawings.

FIG. 10 is a view showing an entire structure of an inspection/manufacturing system to which a maintenance lump management apparatus according to the present invention is applied. This inspection/manufacturing system is set in an inspection/production line of a semiconductor device such as a semiconductor wafer or a liquid crystal display. A plurality of inspection apparatuses or manufacturing apparatuses (which will be referred to as inspection/manufacturing apparatuses hereinafter) 50-1 to 50-3 and 51-1 to 51-3 are provided in this inspection/production line.

It is to be noted that M1 to M3 of the inspection/manufacturing apparatuses 50-1 to 50-3 and 51-1 to 51-3 in FIG. 10 denote respective inspection items as maintenance targets. Three inspection/manufacturing apparatuses 50-1 to 50-3 forming one group are connected with one inspection/manufacturing apparatus personal computer (which will be referred to as a PC hereinafter) 52, and three inspection/manufacturing apparatuses 51-1 to 51-3 forming another group are connected with one inspection/manufacturing apparatus personal computer (which will be referred to as a PC hereinafter) 53.

The respective inspection/manufacturing apparatuses 50-1 to 50-3 and 51-1 to 51-3 are various kinds of inspection apparatuses and various kinds of manufacturing apparatuses like those in the first embodiment shown in FIG. 1.

The PCs 52 and 53 have functions to control operations of the respective inspection/manufacturing apparatuses 50-1 to 50-3 and 51-1 to 51-3 in accordance with information of respective operation conditions (which will be referred to as recipes). The PCs 52 and 53 are connected with a management PC (CIM: Computer Integrated Manufacturing) 14 through a local area network (LAN) 13.

This PC 14 transmits/receives information to/from the PCs 52 and 53 through the LAN 13. To the PC 14 is connected a monitor device 16 such as a color liquid display or a CRT display. The PC 14 includes a management portion 15 in which software (lump intensive management program)

used to read maintenance information of each item in maintenance targets of the respective inspection/manufacturing apparatuses 50-1 to 50-3 and 51-1 to 51-3 and information of respective operation conditions (recipes) and manages them in a lump is installed. The lump management of the recipes in the management portion 15 is the same as that in the first embodiment shown in FIG. 1.

Here, the maintenance target items and their information have, e.g., the following contents in the respective inspection/manufacturing apparatuses 50-1 to 50-3 and 51-1 to 51-3. The maintenance target items are, e.g., a lamp, a suction pad, a motor, a ball screw, a belt (timing belt), a cable in a caterpillar, a monitor and others.

Among them, the lamp is an illumination light source which is used in an inspection/manufacturing apparatus for a semiconductor device such as a liquid crystal display or a semiconductor wafer. The maintenance information of this lamp is, e.g., light intensity value, color temperature, applied voltage value, efficiency (filament temperature), power and others. Among them, the light intensity value is acquired by arranging a light sensor whose switch is turned on in response to the darkness below a predetermined light intensity and detecting an output state when a constant voltage is applied to this light sensor. Further, the light intensity value can be also acquired from measurement value information obtained by arranging an illumination photometer and applying a constant voltage to this illumination photometer.

The color temperature is acquired from measurement value information obtained by arranging, e.g., a color thermometer and applying a constant voltage to this color thermometer. The applied voltage value is acquired from voltage value information which is obtained when, e.g., an actinometer and a voltmeter are arranged and which is required by the lamp to reach a stipulated light intensity. As to the efficiency (filament temperature), its information is obtained from, e.g., a thermometer. In regard to the power, e.g., an actinometer, an ammeter and a voltmeter are arranged, and information of the power is obtained from power value information required for the lamp to reach a stipulated light intensity.

Furthermore, the suction pad as a maintenance target item is used to suck and hold a semiconductor device such as a glass substrate or a semiconductor wafer in a hand of a carriage robot or on a stage. Its maintenance information is a vacuum pressure acquired from detection by, e.g., a pressure sensor. The motor is used to move a carriage robot, a stage, a camera or the like which is used to image a semiconductor device as a target of inspection/production. The maintenance information of the motor is, e.g., noise, vibration, torque, power and others.

The ball screw is used to transmit a rotational motion of a motor to a linear motion. The maintenance information of the ball screw is, e.g., noise, vibration and others. The belt is used to transmit a drive force of the motor to other drive portions. For example, it is used to transmit driving of the motor when moving up or down a lift pin utilized to move the glass substrate onto the stage. The maintenance information of the belt is, e.g., elasticity, a jounce quantity, vibration and others.

The cable in the caterpillar is used to electrically connect a drive portion of the stage or the like with, e.g., peripheral circuits of the PCs 52 and 53. Its maintenance information is, e.g., elasticity, jounce quantity, or electrical poor contact, time or the like. The monitor is used to display a result of inspection or the like in the respective inspection/manufacturing apparatuses 50-1 to 50-3 and 51-1 to 51-3. Its maintenance information is, e.g., power. The management portion 15 executes the respective following functions by activating the lump intensive management program.

The management portion 15 has a function to display and output respective sets of maintenance information of the respective inspection/manufacturing apparatuses 50-1 to 50-3 and 51-1 to 51-3 upon receiving an operation instruction from an operator Q.

FIG. 11 is a schematic view showing display outputs of the maintenance information and the apparatus map. The management portion 15 has a function to display and output the maintenance information of the respective inspection/manufacturing apparatuses 50-1 to 50-3 and 51-1 to 51-3 to the monitor device 16 as a maintenance information display column $V_1$, and visually display and output a apparatus map $V_2$ indicating an arrangement layout of the respective inspection/manufacturing apparatuses 50-1 to 50-3 and 51-1 to 51-3 to the monitor device 16.

Figure 12:
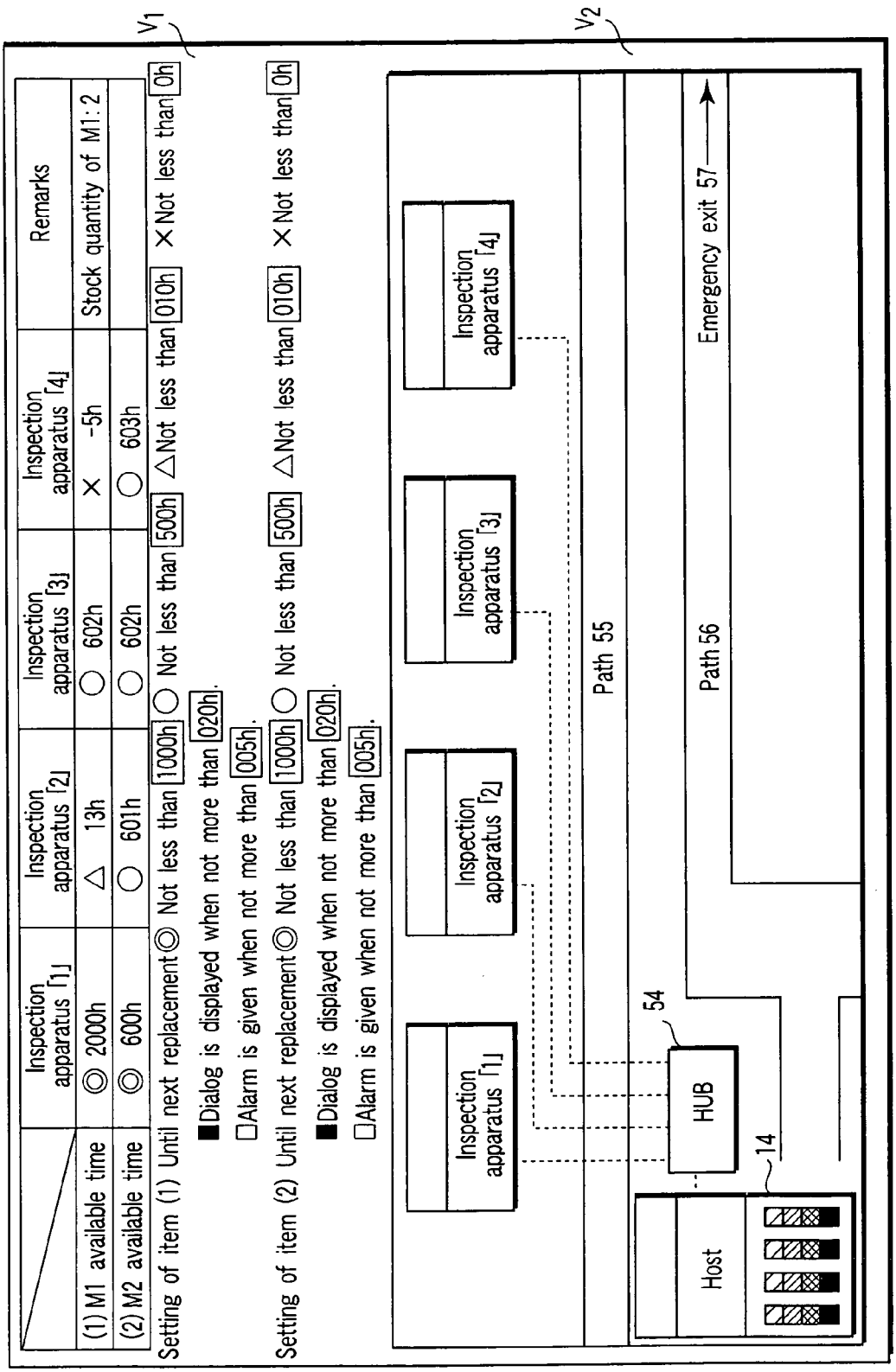
FIG. 12 is a view showing a concrete display example of a maintenance information display column and a apparatus map according to the embodiment of the present invention.

FIG. 12 is a view showing a concrete display example of the maintenance information display column $V_1$ and the apparatus map $V_2$. The maintenance information display column $V_1$ shows, e.g., four inspection/manufacturing apparatuses 50-1 to 50-3 and 51-1 which perform an inspection operation among the inspection/manufacturing apparatuses 50-1 to 50-3 and 51-1 to 51-3 as inspection apparatuses "1" to "4".

This maintenance information display column $V_1$ shows a time until the lamp is replaced (which will be referred to as a lamp available time hereinafter) which is obtained by subtracting a light time of the lamp from an average life time of the lamp when, e.g., respective lamps M1 and M2 are used. That is, an available time when the lamp M1 is used is 2000 h (hours) in the inspection apparatus "1", 13 h in the inspection apparatus "2", 602 h in the inspection apparatus "3" and −5 h in the inspection apparatus "2".

As setting contents of the respective maintenance target items M1 and M2, there is a setting which shows "◉" if the available time until the next lamp replacement is not less than 1000 h, "○" if the available time is not less than 500 h, "△" if the available time is not less than 10 h and "x" if the available time is not less than 0 h with respect to each of the items M1 and M2. In this item, there are settings, i.e., "dialog is displayed when not more than 20 h." and "alarm is given when not more than 5 h." with respect to the inspection apparatuses "1" to "4". In the display example in the drawing, "dialog is displayed when not more than 20 h." is checked by the operator Q, and the management portion 15 displays information to urge the maintenance in the monitor and performs notification to urge the maintenance relative to a corresponding inspection apparatus when the available time T of the lamps M1 and M2 becomes not more than 20 h.

The apparatus map $V_2$ shows a visually displayed output obtained by picturizing an arrangement of the respective inspection apparatuses "1" to "4" or the PC (displayed as a host computer) 14 and a HUB 54 used to connect this PC 14 with the respective inspection apparatuses "1" to "4" set in an actual manufacturing plant.

Moreover, in this apparatus map $V_2$, target objects such as paths 55 and 56 or an emergency exit 57 are also shown as layouts so that where the respective inspection apparatuses "1" to "4" are arranged in the factory can be recognized at a glance. Specifically, in the monitor screen, the two paths 55 and 56 are displayed in the right-and-left direction, the inspection apparatuses "1" to "4" are arranged and displayed on one side of the path 55, and the PC 14 and the HUB 54 are arranged and displayed at the lower left corner in the plant.

The management portion 15 has a function to extract and display maintenance information of a corresponding apparatus when the operator Q specifies a desired apparatus from the visually displayed and output respective inspection apparatuses "1" to "4". Additionally, in the screen of the apparatus map $V_2$, when the operator moves a cursor onto, e.g., the inspection apparatus "1" as a desired apparatus and selects the inspection apparatus "1" by clicking the mouse, a display color of this inspection apparatus "1" is changed into, e.g., a reddish color which can be visually readily recognized, and the other non-selected inspection apparatuses "2" to "4" are displayed in, e.g., gray. The management portion has this identification function. As this identification function, the inspection apparatus "1" selected by a click operation may be stereoscopically displayed.

The management portion 15 has a function to compare the maintenance information of the respective inspection apparatuses "1" to "4" with a set value for a maintenance time limit judgment and perform notification to urge the maintenance when the maintenance information reaches the set value. Further, the management portion 15 has a function to immediately perform notification (warning) to urge the maintenance upon receiving an error signal when the error signal is generated in any of the respective inspection apparatuses "1" to "4".

As a method of performing notification (warning) to urge the maintenance, the management portion 15 displays a message on the monitor device 16 or displays the apparatus map $V_2$ on the monitor device 16 in order to show pictures or marks used to urge the maintenance relative to the apparatus as a maintenance target.

Furthermore, as the method of performing notification (warning) to urge the maintenance, the management portion 15 produces a sound used to urge the maintenance by using a buzzer or a speaker. Moreover, the management portion 15 notifies the maintenance information such as a maintenance target apparatus and a maintenance target item by utilizing an external device such as a portable terminal which is taken along by an operator and has a communication function and a display function.

Additionally, the management portion 15 has a function to notify a home telephone or a mobile phone of an operator, or a telephone or a management computer in a maintenance management department (office) through a telephone line. In this case, a phone number of the home telephone or the mobile phone of the operator or that of the telephone in the maintenance management department is registered in the PC 14, and the PC 14 is connected to the telephone line through a modem. When urging the maintenance, the PC 14 calls the home telephone or the mobile phone of the operator or the telephone in a maintenance company.

The management portion 15 has a function to record a history of each maintenance information of the inspection apparatuses "1" to "4" in the internal memory 17. The management portion 15 has a function to change the set value of the maintenance time limit judgment in accordance with each maintenance target item based on the history of each maintenance information of, e.g., the inspection apparatuses "1" to "4" recorded in the memory 17.

A description will now be given as to an example of the lamp as a maintenance target item. An available time of the lamp until the lamp burnt out is calculated, and a mean time before failure (MTBF) is determined as a recommended set value or a default value. Then, the recommended set value or the default value is changed and set as a new set value for the maintenance time limit judgment. It is to be noted that a calculation technique is not restricted to the mean time before failure (MTBF), and a normal distribution or a Weibull distribution may be used.

Further, as a method of setting the set value for the maintenance time limit judgment, the following method can be also applied. First, a glass substrate or the like as an inspection target is irradiated by using an unused lamp, and a light intensity (brightness) of its reflected light is stored in the memory. After the start of using the lamp, the reflected light from the glass substrate or the like obtained by the lamp is periodically detected, and the detected light intensity (brightness) is compared with a reference light intensity (brightness) stored in the memory. Then, when a percentage (%) of the detected light intensity relative to the reference light intensity (brightness) is lower than a predetermined value, the warning is given.

Furthermore, in case of a halogen lamp used in the auto macro inspection, assuming that L0 is a rated life time, V0 is a rated voltage, L is a life duration after start of a use (available time) and V is a voltage, a relationship of the following expression can be established.

$$L/L0 = (V/V0)^{-10-14}$$

The available time L of the halogen lamp which has started to be used is calculated from this expression, and the warning is given when L is not more than a predetermined value.

Moreover, in case of the halogen lamp, a relationship between a voltage and a light intensity varies depending on individuals. That is, when the same wafer substrate is illuminated by using the halogen lamp with the same recipe (set voltage) and imaging is performed, the brightness of an image differs depending on an individual difference of the lamp. Additionally, the light intensity of the lamp is lowered in accordance with a use time even if the same lamp is used, and the brightness of an image imaged by the same imaging device differs. In order to eliminate irregularities and changes in brightness, a bare wafer as a reference is illuminated by using the lamp in advance, the brightness is measured by using an imaging device or the like while changing a lamp voltage, a lamp characteristic curve indicative of a relationship between the voltage and the brightness (light intensity) is determined as an ideal curve, and a conversion table of the brightness (light intensity) and the voltage is created and stored in the memory 17 of the PC 14.

Then, in regard to the respective inspection apparatuses "1" to "4", a lamp voltage of each of the inspection apparatuses "1" to "4" is adjusted in such a manner that the brightness (light intensity) obtained by illuminating the wafer as an auto macro inspection target by using the lamp becomes equal to the brightness (light intensity) relative to a set voltage of the ideal lamp characteristic curve. This set voltage of the lamp can be used as the recipe in the first embodiment. Based on this conversion table, even if the halogen lamp is replaced, the voltage and the brightness based on individual differences can be corrected, and the same brightness (light intensity) can be always obtained. Further, with respect to a change in brightness due to a reduction in light intensity caused by a use of the halogen lamp, the same light intensity can be always obtained by adjusting the lamp voltage by using the conversion table.

The management portion 15 has a function to manage so as to display and output the maintenance information to the monitor device 16 only when a previously registered password is input. Furthermore, the management portion 15 has a function to prevent only specific operators Q from displaying information in the monitor device 16 by using a hardware key lock.

An operation of the inspection/manufacturing system having the above-described structure will now be described. The management portion 15 of the PC 14 reads all the maintenance information from the PCs 52 and 53 of the respective inspection/manufacturing apparatuses 50-1 to 50-3 and 51-1 to 51-3 through the LAN 13, and displays and outputs the maintenance information to the monitor device 16.

At this time, the management portion 15 reads the maintenance information of the respective inspection/manufacturing apparatuses 50-1 to 50-3 and 51-1 to 51-3 by the following method.

Figure 13:
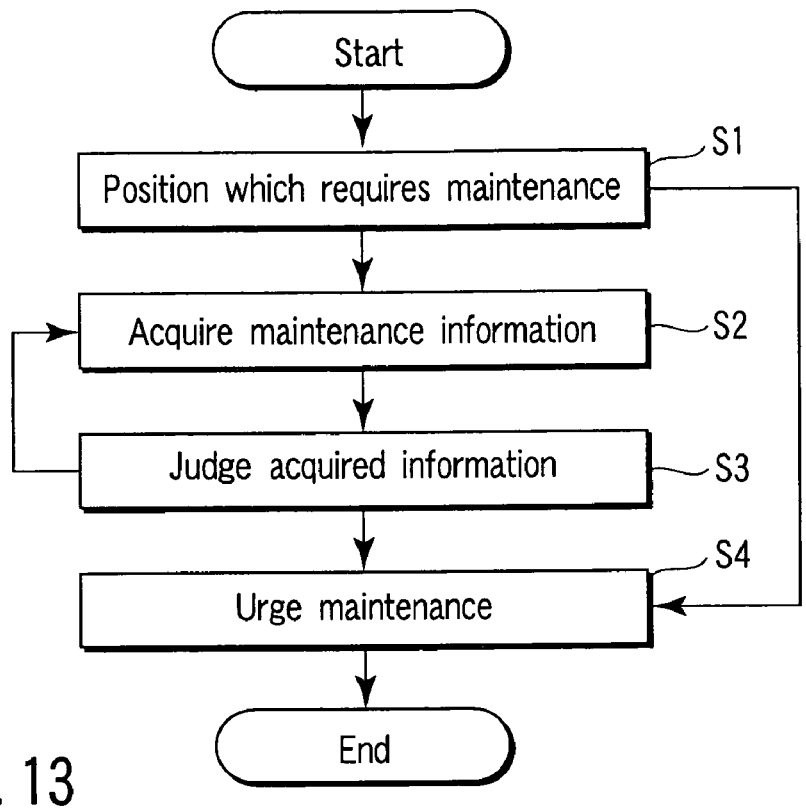
FIG. 13 is a flowchart showing a method of reading maintenance information according to the embodiment of the present invention.

FIG. 13 is a flowchart showing a method of reading the maintenance information. The maintenance portion 15 selects items of the parts which require the maintenance from the maintenance target items, e.g., a lamp, a suction pad, a motor, a ball screw, a belt (timing belt), a cable in a caterpillar, a monitor and others in the respective inspection/manufacturing apparatuses 50-1 to 50-3 and 51-1 to 51-3 at a step S1.

Subsequently, at a step S2, in regard to items at parts which require the maintenance, the management portion 15 reads the maintenance information of the items which is required for the maintenance from the PCs 52 and 53 of the respective inspection/manufacturing apparatuses 50-1 to 50-3 and 51-1 to 51-3 through the LAN 13, and displays and outputs the maintenance information and the apparatus map $V_2$ together with the maintenance information display column $V_1$ to the monitor device 16 as shown in FIG. 12.

Then, at a step S3, the management portion 15 compares each maintenance information of the inspection apparatuses "1" to "4" with each maintenance time limit judgment set value, and judges whether the maintenance information has reached the set value. When it is determined that the maintenance information has reached the set value, the management portion 15 shifts to a step S4 and performs notification to urge the maintenance.

For example, the maintenance information display column $V_1$ depicted in FIG. 12 shows available times of the lamps M1 and M2 as the respective maintenance target items relative to the inspection apparatuses "1" to "4". Further, in the maintenance information display column $V_1$, the item "dialog is displayed when not more than 20 h." is checked by an operator Q. As a result, the management portion 15 displays information to urge the maintenance in the monitor and gives a warning when it obtains the maintenance information indicating that, e.g., the available time of the lamp M1 has become not more than 20 h.

On the other hand, when the lamps M1 and M2 of one of the inspection apparatuses "1" to "4" have burnt out and an error signal is generated, the management portion 15 shifts from the step S1 to the step S4 and immediately gives a warning to urge the maintenance upon receiving the error signal from the inspection apparatuses "1" to "4".

Figure 14:
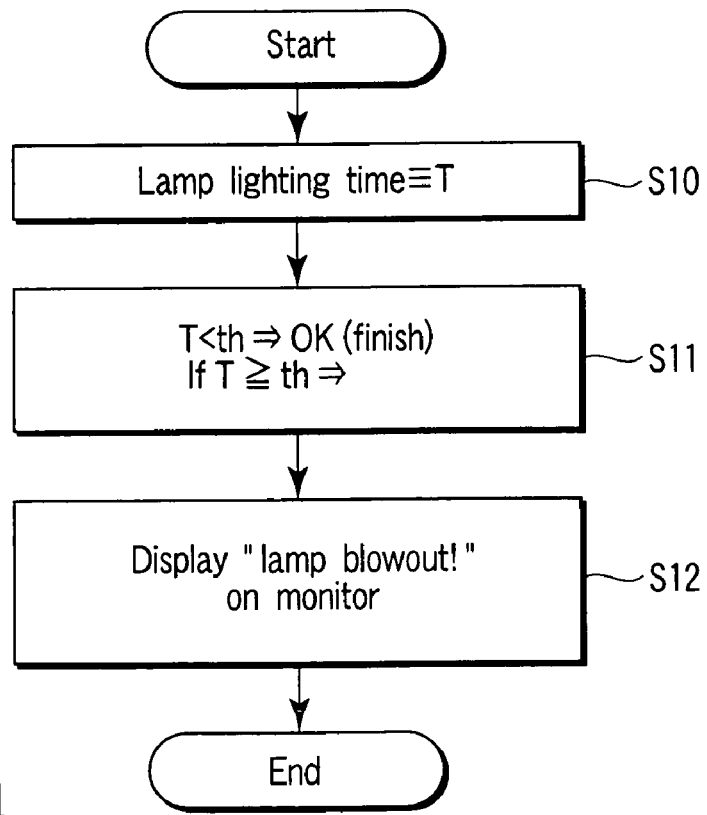
FIG. 14 is a flowchart of a judgment on the maintenance information according to the embodiment of the present invention.

FIG. 14 is a flowchart of a judgment on the maintenance information. A judgment upon whether the maintenance information has reached the set value is made along the flowchart depicted in FIG. 14. In this judgment example, the lamp is exemplified as a maintenance target item.

For example, at a step S10, the PCs 52 and 53 in the inspection apparatuses "1" to "4" read a time that each lamp of the inspection/manufacturing apparatuses 50-1 to 50-3 and 51-1 is on or a time that each power supply of the same is on as the maintenance information of a lighting time T of each lamp and notify the management portion 15 of this time.

Then, at a step S11, the management portion 15 compares an available time T obtained by subtracting the lighting time from an average life time of the lamp with each set value th for the maintenance time limit judgment (⊚: 1000 h, ○: 500 h, △: 10 h, x: 0 h, a dialog: 20 h, an alarm: 5 h). If the available time T of the lamp is longer than the dialog set value th as a result of this comparison, the management portion 15 determines to allow (OK) a use of that lamp. That is, if a remaining time until the replacement of the lamp obtained by subtracting an integrated value of the lighting times from the average life time (2000 h) of the lamp is longer than the time (20 h) set in the dialog, it is determined that the lamp can be used. In this case, the management portion 15 displays the information indicating that the lamp can be sufficiently used in the maintenance information display column V1 depicted in FIG. 12 by using, e.g., "⊚" if the available time of the lamp is not less than 1000 h and "○" if the same is not less than 500 h, and displays the information to beware that the lamp is close to a life end point by using, e.g., "△" if the available time T of the lamp is 500 to 10 h, for example.

On the other hand, if the available time T of the lamp is not more than the dialog set value th (20 h), the management portion 15 shifts to a step S12 and determines that the lamp has reached the life end point. In this case, the management portion 15 displays "x" in the maintenance information display column $V_1$ shown in, e.g., FIG. 12.

Moreover, when it is determined that the lamp has reached the life end point, the management portion 15 displays a message, a picture, a mark or the like to urge the maintenance relative to this lamp in the monitor device, or gives a warning by using a buzzer or the like.

Figure 15:
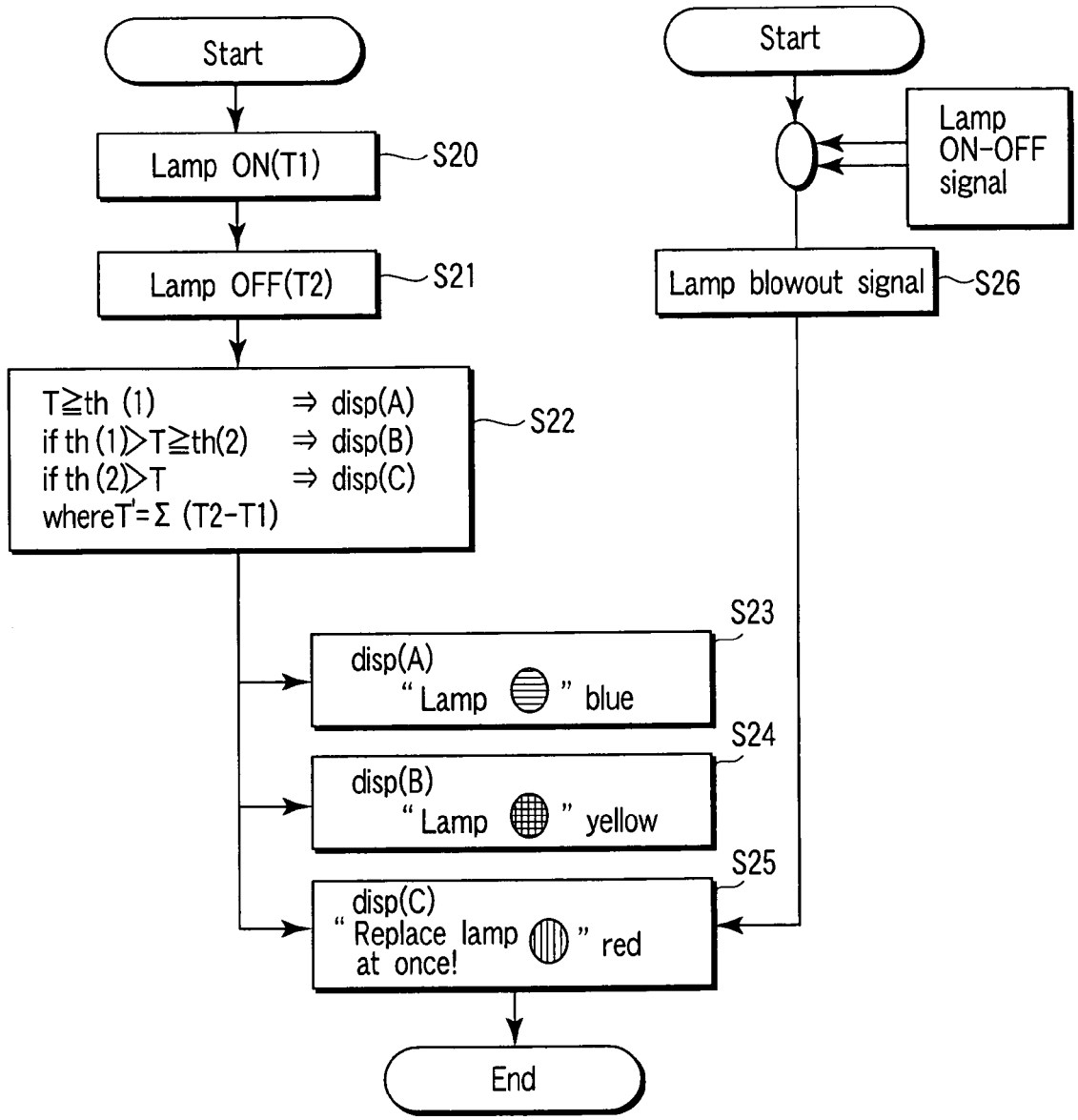
FIG. 15 is a flowchart of a judgment on the maintenance information according to the embodiment of the present invention.
Figure 16:
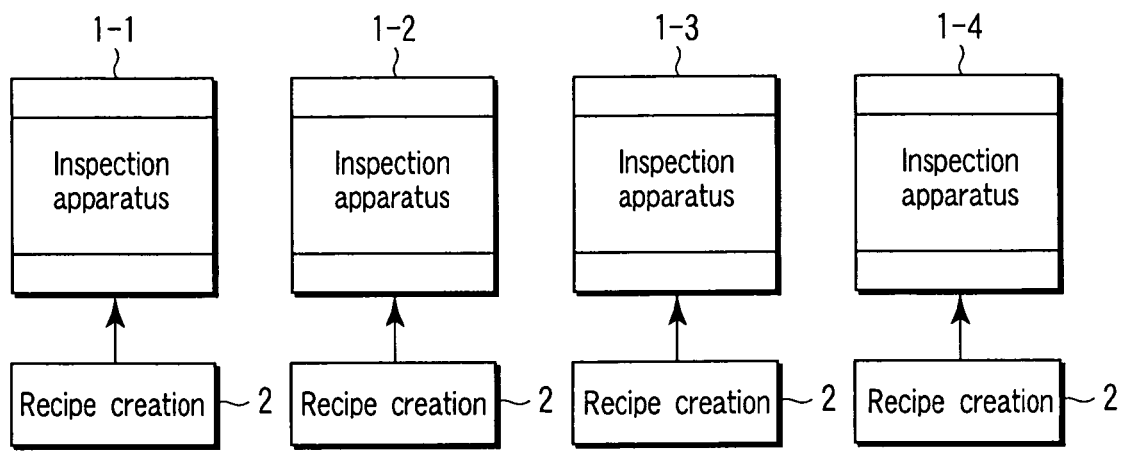
FIG. 16 is a view illustrating a method of setting a recipe to each inspection apparatus in the prior art.
Figure 17:
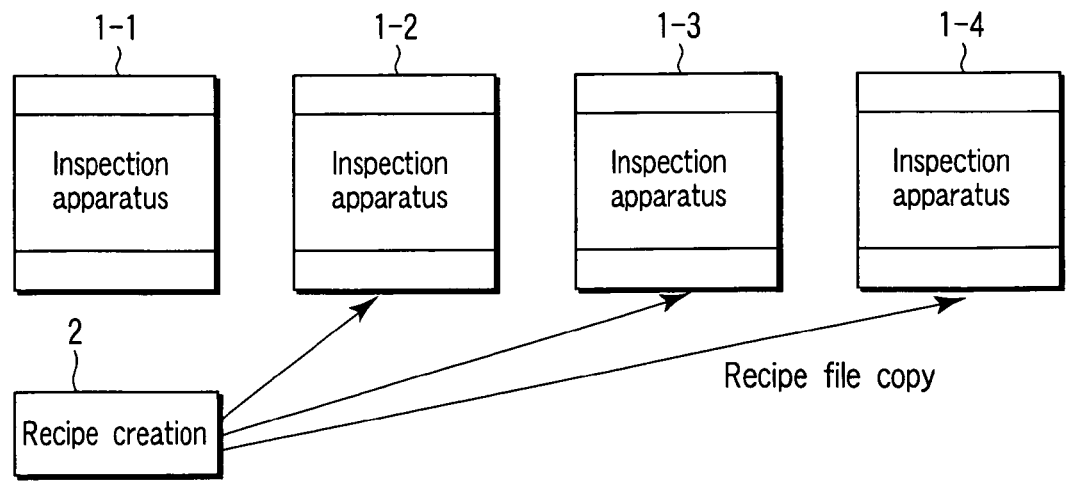
FIG. 17 is a view illustrating a method of setting a recipe to each inspection apparatus in the prior art.
Figure 18:
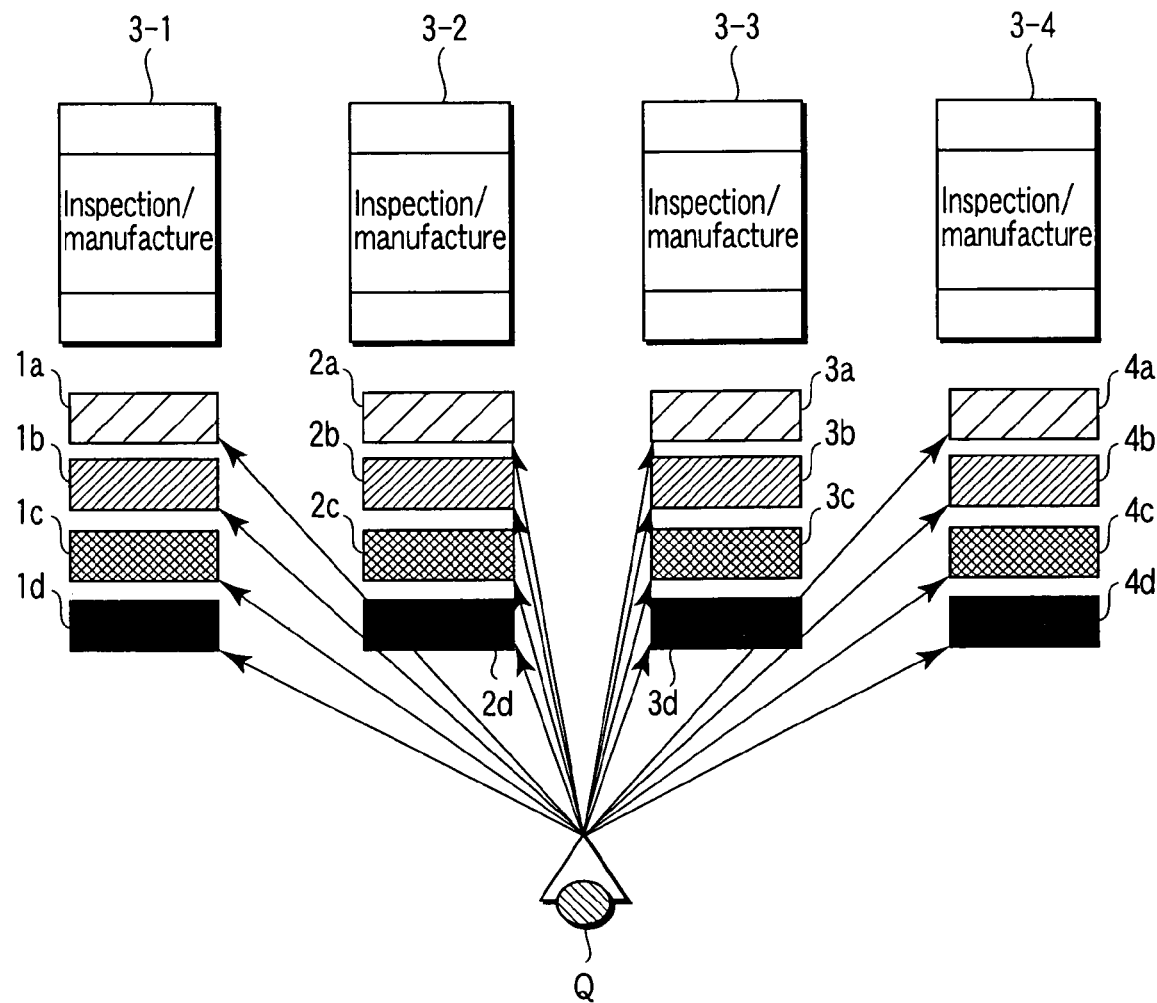
FIG. 18 is a view illustrating a method of acquiring maintenance information with respect to each inspection/manufacturing apparatus in the prior art.

FIG. 15 is a flowchart embodying the judgment on the maintenance information that the lamp is applied as a maintenance target item M. A judgment upon whether the maintenance information is close to the set value is made along the flowchart depicted in FIG. 15.

At steps S20 and S21, the PCs 52 and 53 in the inspection apparatuses "1" to "4" detect a time T1 at which the lamp is turned on (ON) and a time T2 at which it is turned off (OFF), and obtain a lighting time T' ($\Sigma$(T2−T1)) of the lamp by counting.

Then, the management portion 15 of the PC 14 transmits/receives data to/from the PCs 52 and 53 through the LAN 13, and reads the lighting time T' of the lamp with respect to each of the inspection apparatuses "1" to "4". The management portion 15 obtains the available time T of the lamp by subtracting lighting time T' from the average life time of the lamp.

Subsequently, at a step S22, the management portion 15 compares the available time T' of the lamp with respective set values th(1) and th(2) for the maintenance time limit judgment which are determined from the average life time of the lamp or the like. Here, the set value th(1) is used to notify that a replacement timing is approaching. For example, it corresponds to the average life time of the lamp, e.g., 500 h of "○" depicted in FIG. 12. The set value th(2) is used to give a warning that the lamp will burn out if it is further used. For example, it corresponds to 10 h of "△" or 20 h of the dialog depicted in FIG. 12. This set value th(2) indicates a remaining use time of the lamp which has a high possibility that the lamp may be burned out, resulting in no guarantee of a use.

If the available time T of the lamp is not less than the set value th(1) as a result of the comparison (T≧th(1)), the management portion 15 determines to allow (OK) a use of the lamp. In this case, the management portion 15 shifts to a step S23, and displays each of the inspection apparatuses "1" to "4" whose use of the lamp is determined to be allowed (OK) in, e.g., blue which guarantees the safety of a use in the maintenance information display column $V_1$ depicted in, e.g., FIG. 12. Besides, the management portion 15 may superpose and display, e.g., "⊚" if the remaining time until the lamp replacement is not less than 1000 h and "○" if the same is not less than 500 h.

Moreover, if the available time T of the lamp is between the set values th(1) and th(2) (th(1)>T≧th(2)) as a result of the comparison, the management portion 15 determines that the replacement timing of the lamp is approaching, shifts to a step S24, and displays each of the inspection apparatuses "1" to "4" which includes this lamp in, e.g., yellow which calls attentions. Besides, the management portion 15 may superpose and displays, e.g., "Δ" if the remaining time until the lamp replacement is not less than 10 h.

Additionally, if the available time T of the lamp is less than the set value th(2) (th(2)>T) as a result of the comparison, the management portion 17 determines that the lamp must be replaced as soon as possible, shifts to a step S25, and displays each of the inspection apparatuses "1" to "4" which includes the lamp in red which means a warning. Besides, the management portion 15 superposes and displays, e.g., "x" until the lamp which has reached the life end point is replaced with a new lamp, and keeps giving a warning by using a buzzer or the like.

On the other hand, when the lamp of one of the inspection apparatuses "1" to "4" is burnt out and an error signal is generated, the management portion 15 receives the error signal (lamp blowout signal) through the LAN 13.

At a step S26, upon receiving the error signal, the management portion 15 is forcibly shifted to the step S25, determines that the lamp must be replaced as soon as possible, and displays each of the inspection apparatuses "1" to "4" which includes this lamp in, e.g., red which means a warning. Besides, the management portion 15 superposes and displays, e.g., "x" until the lamp which has reached the life end point is replaced with a new lamp, keeps giving a warning by using a buzzer or the like, and urgently notifies a portable terminal of an operator.

As described above, in the second embodiment, the PC 14 is connected through the LAN 13 with the PCs 52 and 53 connected with the inspection/manufacturing apparatuses 50-1 to 50-3 and 51-1 to 51-3, each maintenance information of the maintenance target items of the respective inspection/manufacturing apparatuses 50-1 to 50-3 and 51-1 to 51-3 can be read and intensively managed in a lump by using the management portion 15 of this PC 14.

As a result, the operator Q does not have to occasionally go to installation positions of the inspection/manufacturing apparatuses 50-1 to 50-3 and 51-1 to 51-3 in order to confirm each hour meter of each of the inspection/manufacturing apparatuses 50-1 to 50-3 and 51-1 to 51-3 like the prior art, the maintenance target item, e.g., the maintenance of the life duration of a lamp can be intensively managed by using one PC 14, and the maintenance management can be easily performed. For example, the number of times that the operator Q goes to the installation positions can be reduced to the minimum level.

Furthermore, the maintenance information of the respective inspection/manufacturing apparatuses 50-1 to 50-3 and 51-1 to 51-3 is displayed and output as the maintenance information display column $V_1$, and the apparatus map $V_2$ indicating the arrangement layout of these inspection/manufacturing apparatuses 50-1 to 50-3 and 51-1 to 51-3 is visually displayed and output.

As a result, the operator Q can assuredly set/change the maintenance target item relative to a apparatus which currently requires the maintenance, e.g., the inspection/manufacturing apparatus 50-1 without making a mistake.

In particular, the apparatus map $V_2$ visually displays and outputs the arrangement of the respective inspection apparatuses "1" to "4" or the PC 14 set in an actual manufacturing plant in the form of a drawing, and displays an inspection apparatus which requires the maintenance in a conformation different from those of the other inspection apparatuses, e.g., using a symbol or displaying in a different color such as a color change. As a result, the operator Q does not take a apparatus which currently requires the maintenance, e.g., the inspection/manufacturing apparatus 10-1 for the other apparatuses, and it is possible to avoid a confirmation error of a maintenance target item or an input error of various kinds of information such as settings/changes of a maintenance target item. Moreover, the efficiency of these operations can be improved.

Additionally, a maintenance timing or an error signal is monitored based on the maintenance information of the inspection apparatuses "1" to "4", and notification (warning) to urge the maintenance is carried out when it is determined that the maintenance is required. As a result, the maintenance target items in the respective inspection apparatuses "1" to "4" can be monitored, and it is possible to assuredly and rapidly cope with the maintenance before a trouble occurs.

For example, in a production line of a semiconductor device, shutting down the production line due to a trouble such as blowout of a lamp of an inspection apparatus or a manufacturing apparatus becomes a factor of reducing an operating ratio. In order to avoid this factor, the maintenance must be performed in advance. For example, the lamp is replaced before a problem occurs with respect to each maintenance item. According to the present invention, since the maintenance items are intensively monitored in a lump, the maintenance, e.g., replacing the lamp in advance can be assuredly performed before blowing out the lump.

As a method of notification to urge the maintenance at this time, the inspection apparatuses "1" to "4" including the lamp is displayed in, e.g., blue which means to allow (OK) a use of the lamp, the respective inspection apparatuses "1" to "4" including the lamp is displayed in, e.g., yellow which means a replacement timing of the lamp is approaching, or the respective inspection apparatuses "1" to "4" including the lamp is displayed in, e.g., red which means that the lamp must be replaced as soon as possible. Therefore, a use state of the lamp can be correctly grasped.

Further, when there is generated an error signal due to blowout of a lamp of any inspection apparatus among the inspection apparatuses "1" to "4", immediately giving a warning to urge the maintenance upon receiving the error signal from these inspection apparatuses "1" to "4" enables replacement of the lamp as soon as possible.

Furthermore, as a method of notification to urge the maintenance, a notification or a warning is given by using a message or an image such as a picture or a mark used to urge the maintenance, the notification or the warning is given by using a buzzer, a speaker or the like, or an urgent notification is given to a portable terminal brought by an operator or a telephone in a maintenance management department having a standing operator. As a result, information to urge the maintenance can be assuredly visually or auditorily transmitted to the operator Q.

Moreover, since a history of the maintenance information of each inspection apparatus is recorded in the memory 17, checking the maintenance information and a history of that operator Q can inquire a factor of occurrence of a difference in operation between the respective inspection/manufacturing apparatuses when such a difference is generated. Additionally, by changing/setting a set value for the maintenance time limit judgment based on a history of the maintenance information of the respective inspection apparatuses, an appropriate set value for the maintenance time limit judgment can be obtained with respect to the maintenance target item based on actually used results.

Further, since the maintenance information is managed so as to be displayed and output to the monitor device 16 only when a previously registered password is input, persons other than a specific operator Q can be prevented from operating the maintenance information. When the operator Q is restricted based on the password input in this manner, a set content of, e.g., the maintenance information can be protected, and the management of the maintenance information or the like can be facilitated.

It is to be noted that operation items in the maintenance can be simplified by automatically setting an initial value (default value) upon inputting information indicating that the maintenance should be carried out. Furthermore, inputting inventory information of maintenance components can reduce an MTTR (Mean Time To Repair).

According to the second embodiment, not only the maintenance of the lamp is easily carried out, but the maintenance management can be likewise readily performed with respect to a suction pad, a motor, a ball screw, a belt (timing belt), a cable in a caterpillar, a monitor and others in the respective inspection/manufacturing apparatuses 50-1 to 50-3 and 51-1 to 51-3 without going to positions where the respective inspection/manufacturing apparatuses 50-1 to 50-3 and 51-1 to 51-3 are set.

It is to be noted that the present invention is not restricted to the second embodiment, and various modifications can be carried out on an embodying stage without departing from the scope of the invention.

For example, although the PC 14 is connected to the respective PCs 52 and 53 of the inspection/manufacturing apparatuses 50-1 to 50-3 and 51-1 to 51-3 through the LAN 13 in the second embodiment, the LAN 13 is not the only communicating means between these inspection/manufacturing apparatuses 50-1 to 50-3 and 51-1 to 51-3 and the PC 14 and the Internet may be used. Therefore, the PC 14 relative to the respective inspection/manufacturing apparatuses 50-1 to 50-3 and 51-1 to 51-3 does not have to be provided in a manufacturing plant where the respective inspection/manufacturing apparatuses 50-1 to 50-3 and 51-1 to 51-1 to 51-3 are installed, and the PC 14 may be provided in, e.g., a lump management center established in another area (e.g., in or out of the Japan) so that each maintenance information of each apparatus in a plurality of manufacturing plants can be intensively managed in a lump.

Moreover, the monitor device 16 which displays the display column $V_1$ of inspection/manufacture conditions and the visually displayed apparatus map $V_2$ is not restricted to a color liquid crystal display or a CRT display, it is possible to use a display which uses light emitting diode (LED) or a display which shows information in an indicator panel having an arrangement drawing of the respective inspection/manufacturing apparatuses 10-1 to 10-4 in the form of symbols by using lamps or the like.

The present invention is not restricted to the foregoing embodiments, and it can be fitly modified and carried out without departing from its scope.

According to the present invention, it is possible to provide a lump management apparatus which manages recipes or maintenance information of various kinds of apparatuses in a lump and can perform settings or changes of recipes or management of maintenance without making a mistake.

What is claimed is:

1. A group management apparatus comprising:
   a plurality of inspection/manufacturing apparatuses arranged in a semiconductor production line;
   sensor units for acquiring maintenance information concerning maintenance target items of the respective inspection/manufacturing apparatuses;
   a plurality of inspection/manufacturing apparatus computers, each of which is connected to at least one of the inspection/manufacturing apparatuses and controls operations of the at least one inspection/manufacturing apparatus connected thereto in accordance with operation conditions corresponding to said at least one inspection/manufacturing apparatus; and
   a management computer which is connected with the inspection/manufacturing apparatus computers through a communication line, said management computer comprising:
      a transmission/reception section to transmit and receive information to and from the inspection/manufacturing apparatus computers with respect to at least one of: each information item of the operation conditions corresponding to the respective inspection/manufacturing apparatuses, and the maintenance information from each said sensor unit;
      a change section to intensively manage the operation conditions set to the respective inspection/manufacturing apparatus computers as a group and to change the respective operation conditions of at least a selected plurality of the inspection/manufacturing apparatuses as a group with respect to the at least one inspection/manufacturing computer corresponding to said at least a plurality of the inspection/manufacturing apparatuses;
      a notification section to intensively manage the maintenance information from each sensor unit of each inspection/manufacturing apparatus as a group, to monitor the maintenance information of the respective inspection/manufacturing apparatuses in order to predict a problem, and to issue a warning at a time of occurrence of the problem; and
      a display section to display on a same display screen of a monitor device: (i) at least one of each said information item of the operation conditions of the respective inspection/manufacturing apparatuses, and each said maintenance information item, and (ii) an arrangement layout drawing of the inspection/manufacturing apparatuses;
   wherein each of the inspection/manufacturing apparatuses has a plurality of types of inspection functions; and
   wherein the change section of the management computer selects at least one of the inspection functions, and changes only the selected at least one inspection function when changing the operation conditions of said at least a plurality of the inspection/manufacturing apparatuses as a group.

2. The group management apparatus according to claim 1, wherein, when at least one of the inspection/manufacturing apparatuses is specified on the arrangement layout drawing, the display section of the management computer displays each said specified inspection/manufacturing apparatus in a different conformation than unspecified inspection/manufacturing apparatuses in the arrangement layout drawing.

3. The group management apparatus according to claim 1, wherein, when at least one of the inspection/manufacturing apparatuses is specified on the arrangement layout drawing, the display section of the management computer extracts and displays the maintenance information corresponding to the at least one specified inspection/manufacturing apparatus, and displays each said specified inspection/manufacturing apparatus in a different conformation than unspecified inspection/manufacturing apparatuses in the arrangement layout drawing.

4. The group management apparatus according to claim 1, wherein said plurality of inspection/manufacturing apparatuses are classified for changing the corresponding operation conditions one of: by apparatus, by apparatus category, and by inspection/manufacturing line, and
wherein the display section displays the operation conditions corresponding to the classified inspection/manufacturing apparatuses in a display column, the operation conditions are one of set and rearranged via manipulation of the display column, and the change section rewrites the operation conditions of the classified inspection/manufacturing apparatuses as a group.

5. A group management apparatus comprising:
a plurality of inspection/manufacturing apparatuses arranged in a semiconductor production line;
sensor units for acquiring maintenance information concerning maintenance target items of the respective inspection/manufacturing apparatuses;
a plurality of inspection/manufacturing apparatus computers, each of which is connected to at least one of the inspection/manufacturing apparatuses and controls operations of the at least one inspection/manufacturing apparatus connected thereto in accordance with operation conditions corresponding to said at least one inspection/manufacturing apparatus; and
a management computer which is connected with the inspection/manufacturing apparatus computers through a communication line, said management computer comprising:
a transmission/reception section to transmit and receive information to and from the inspection/manufacturing apparatus computers with respect to at least one of: each information item of the operation conditions corresponding to the respective inspection/manufacturing apparatuses, and the maintenance information from each said sensor unit;
a change section to intensively manage the operation conditions set to the respective inspection/manufacturing apparatus computers as a group and to change the respective operation conditions of at least a selected plurality of the inspection/manufacturing apparatuses as a group with respect to the at least one inspection/manufacturing computer corresponding to said at least a plurality of the inspection/manufacturing apparatuses;
a notification section to intensively manage the maintenance information from each sensor unit of each inspection/manufacturing apparatus as a group, to monitor the maintenance information of the respective inspection/manufacturing apparatuses in order to predict a problem, and to issue a warning at a time of occurrence of the problem; and
a display section to display on a same display screen of a monitor device: (i) at least one of each said information item of the operation conditions of the respective inspection/manufacturing apparatuses, and each said maintenance information item, and (ii) an arrangement layout drawing of the inspection/manufacturing apparatuses;
wherein the display section of the management computer displays the inspection/manufacturing apparatuses as management targets and displays the inspection/manufacturing apparatuses and the operation conditions thereof in respective lists, and
wherein the display section does not display any apparatus which is not a management target in a list, and displays the inspection/manufacturing apparatuses as the management targets in a different conformation than said any apparatus that is not a management target in the arrangement layout drawing.

6. A group management apparatus comprising:
a plurality of inspection/manufacturing apparatuses arranged in a semiconductor production line;
sensor units for acquiring maintenance information concerning maintenance target items of the respective inspection/manufacturing apparatuses;
a plurality of inspection/manufacturing apparatus computers, each of which is connected to at least one of the inspection/manufacturing apparatuses and controls operations of the at least one inspection/manufacturing apparatus connected thereto in accordance with operation conditions corresponding to said at least one inspection/manufacturing apparatus; and
a management computer which is connected with the inspection/manufacturing apparatus computers through a communication line, said management computer comprising:
a transmission/reception section to transmit and receive information to and from the inspection/manufacturing apparatus computers with respect to at least one of: each information item of the operation conditions corresponding to the respective inspection/manufacturing apparatuses, and the maintenance information from each said sensor unit;
a change section to intensively manage the operation conditions set to the respective inspection/manufacturing apparatus computers as a croup and to change the respective operation conditions of at least a selected plurality of the inspection/manufacturing apparatuses as a group with respect to the at least one inspection/manufacturing computer corresponding to said at least a plurality of the inspection/manufacturing apparatuses;
a notification section to intensively manage the maintenance information from each sensor unit of each inspection/manufacturing apparatus as a group, to monitor the maintenance information of the respective inspection/manufacturing apparatuses in order to predict a problem, and to issue a warning at a time of occurrence of the problem;
a display section to display on a same display screen of a monitor device: (i) at least one of each said information item of the operation conditions of the respective inspection/manufacturing apparatuses, and each said maintenance information item, and (ii) an arrangement layout drawing of the inspection/manufacturing apparatuses; and a setting section to set a timing to validate the operation conditions changed as a group.

7. A group management apparatus comprising:
a plurality of inspection/manufacturing apparatuses arranged in a semiconductor production line;
sensor units for acquiring maintenance information concerning maintenance target items of the respective inspection/manufacturing apparatuses;
a plurality of inspection/manufacturing apparatus computers, each of which is connected to at least one of the inspection/manufacturing apparatuses and controls operations of the at least one inspection/manufacturing apparatus connected thereto in accordance with operation conditions corresponding to said at least one inspection/manufacturing apparatus; and
a management computer which is connected with the inspection/manufacturing apparatus computers through a communication line, said management computer comprising:
   a transmission/reception section to transmit and receive information to and from the inspection/manufacturing apparatus computers with respect to at least one of: each information item of the operation conditions corresponding to the respective inspection/manufacturing apparatuses, and the maintenance information from each said sensor unit;
   a change section to intensively manage the operation conditions set to the respective inspection/manufacturing apparatus computers as a group and to change the respective operation conditions of at least a selected plurality of the inspection/manufacturing apparatuses as a group with respect to the at least one inspection/manufacturing computer corresponding to said at least a plurality of the inspection/manufacturing apparatuses;
   a notification section to intensively manage the maintenance information from each sensor unit of each inspection/manufacturing apparatus as a group, to monitor the maintenance information of the respective inspection/manufacturing apparatuses in order to predict a problem, and to issue a warning at a time of occurrence of the problem; and
   a display section to display on a same display screen of a monitor device: (i) at least one of each said information item of the operation conditions of the respective inspection/manufacturing apparatuses, and each said maintenance information item, and (ii) an arrangement layout drawing of the inspection/manufacturing apparatuses;
wherein the maintenance target items of the respective inspection/manufacturing apparatuses comprise a light source used in inspection or manufacture in each of the inspection/manufacturing apparatuses; and
wherein the notification section: (i) integrates lighting times of the respective light sources of the respective inspection/manufacturing apparatuses and compares an integration result with an average life time, (ii) generates a notification when the light source is close to a life end point, (iii) generates a warning sound until replacement of the light source when the average life time is reached and when the light source cannot be used, and (iv) notifies a portable terminal of an operator of a warning.

8. A group management apparatus comprising:
a plurality of inspection/manufacturing apparatuses arranged in a semiconductor production line;
sensor units for acquiring maintenance information concerning maintenance target items of the respective inspection/manufacturing apparatuses;
a plurality of inspection/manufacturing apparatus computers, each of which is connected to at least one of the inspection/manufacturing apparatuses and controls operations of the at least one inspection/manufacturing apparatus connected thereto in accordance with operation conditions corresponding to said at least one inspection/manufacturing apparatus; and
a management computer which is connected with the inspection/manufacturing apparatus computers through a communication line, said management computer comprising:
   a transmission/reception section to transmit and receive information to and from the inspection/manufacturing apparatus computers with respect to at least one of: each information item of the operation conditions corresponding to the respective inspection/manufacturing apparatuses, and the maintenance information from each said sensor unit;
   a change section to intensively manage the operation conditions set to the respective inspection/manufacturing apparatus computers as a group and to change the respective operation conditions of at least a selected plurality of the inspection/manufacturing apparatuses as a group with respect to the at least one inspection/manufacturing computer corresponding to said at least a plurality of the inspection/manufacturing apparatuses;
   a notification section to intensively manage the maintenance information from each sensor unit of each inspection/manufacturing apparatus as a group, to monitor the maintenance information of the respective inspection/manufacturing apparatuses in order to predict a problem, and to issue a warning at a time of occurrence of the problem; and
   a display section to display on a same display screen of a monitor device: (i) at least one of each said information item of the operation conditions of the respective inspection/manufacturing apparatuses, and each said maintenance information item, and (ii) an arrangement layout drawing of the inspection/manufacturing apparatuses;
wherein the maintenance target items of the respective inspection/manufacturing apparatuses comprise a light source used in inspection or manufacture in each of the inspection/manufacturing apparatuses; and
wherein the management computer further comprises a light control section which: (i) illuminates a reference inspection/manufacturing object with each said light source while changing a voltage of the light source, (ii) creates an ideal lamp characteristic curve based on brightness data and a voltage obtained by measuring with a corresponding said sensor unit a brightness of light beams reflected from the reference inspection/manufacturing object during the illumination, and (iii) during inspection/manufacturing of an object to be inspected/manufactured, adjusts a voltage of the light source such that a brightness of the object to be inspected/manufactured is equal to a brightness corresponding to a set voltage of the ideal lamp characteristic curve.

* * * * *